United States Patent
Leck et al.

(10) Patent No.: US 9,902,888 B2
(45) Date of Patent: Feb. 27, 2018

(54) COMPOSITIONS COMPRISING DIFLUOROMETHANE, PENTAFLUOROETHANE, TETRAFLUOROPROPENE, AND TETRAFLUOROETHANE AND USES THEREOF

(71) Applicant: THE CHEMOURS COMPANY FC, LLC, Wilmington, DE (US)

(72) Inventors: Thomas Joseph Leck, Hockessin, DE (US); Konstantinos Kontomaris, Wilmington, DE (US); Pavanandan Kista Naicker, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 76 days.

(21) Appl. No.: 15/026,067

(22) PCT Filed: Oct. 6, 2014

(86) PCT No.: PCT/US2014/059257
§ 371 (c)(1),
(2) Date: Mar. 30, 2016

(87) PCT Pub. No.: WO2015/054110
PCT Pub. Date: Apr. 16, 2015

(65) Prior Publication Data
US 2016/0244651 A1 Aug. 25, 2016

Related U.S. Application Data

(60) Provisional application No. 61/889,077, filed on Oct. 10, 2013, provisional application No. 61/911,114, filed on Dec. 3, 2013.

(51) Int. Cl.
*C09K 5/04* (2006.01)
*F25B 7/00* (2006.01)
(Continued)

(52) U.S. Cl.
CPC ............... *C09K 5/045* (2013.01); *F25B 7/00* (2013.01); *F25B 30/02* (2013.01); *F25B 39/00* (2013.01);
(Continued)

(58) Field of Classification Search
CPC .............. C09K 2205/126; C09K 5/045; C09K 2205/22
See application file for complete search history.

(56) References Cited

U.S. PATENT DOCUMENTS

2006/0106263 A1   5/2006   Miller et al.
2008/0230738 A1   9/2008   Minor et al.
(Continued)

FOREIGN PATENT DOCUMENTS

WO   2010/129920 A1   11/2010
WO   2013/122892 A1   8/2013
WO   2015/077134 A1   5/2015

OTHER PUBLICATIONS

PCT International Search Report and Written Opinion dated Mar. 9, 2015.
(Continued)

*Primary Examiner* — John R Hardee
(74) *Attorney, Agent, or Firm* — N. Lynn Tucker

(57) ABSTRACT

Disclosed herein is a composition comprising (a) from 1 to 29 weight percent difluoromethane; (b) from 1 to 19 weight percent pentafluoroethane; (c) from 9 to 42 weight percent 1,1,2,2-tetrafluoroethane, 1,1,1,2-tetrafluoroethane, or a mixture thereof; and (d) from 34 to 68 weight percent 2,3,3,3-tetrafluoropropene, E-1,3,3,3-tetrafluoropropene or mixture thereof; wherein when the composition contains 2,3,3,3-tetrafluoropropene, the composition also contains at least some 1,1,2,2-tetrafluoroethane; wherein the ratio of component (a) to component (b) is at most 1.5:1; and
(Continued)

wherein the ratio of component (c) to component (d) is at least 0.04:1. The compositions are useful in methods for producing cooling and heating, methods for producing air conditioning, methods for replacing HCFC-22, R-410A, R-407C, HFC-134a, CFC-12, HCFC-22 and HCFC-124 and in heat transfer systems including heat pumps and air conditioners.

19 Claims, 3 Drawing Sheets

(51) Int. Cl.
    F25B 30/02      (2006.01)
    F25B 39/00      (2006.01)
    F28D 21/00      (2006.01)
    F25B 39/02      (2006.01)
(52) U.S. Cl.
    CPC .... *F28D 21/0017* (2013.01); *C09K 2205/126* (2013.01); *C09K 2205/22* (2013.01); *C09K 2205/40* (2013.01); *C09K 2205/43* (2013.01); *F25B 39/02* (2013.01); *Y02B 30/52* (2013.01); *Y02P 20/124* (2015.11)

(56) References Cited

U.S. PATENT DOCUMENTS

| | | |
|---|---|---|
| 2008/0314073 A1 | 12/2008 | Minor et al. |
| 2010/0122545 A1 | 5/2010 | Minor et al. |
| 2011/0219815 A1 | 9/2011 | Yana Motta et al. |
| 2012/0216551 A1 | 8/2012 | Minor et al. |
| 2012/0255316 A1 | 10/2012 | Andre et al. |
| 2013/0096218 A1 | 4/2013 | Rached et al. |
| 2013/0193369 A1 | 8/2013 | Low |
| 2013/0219929 A1 | 8/2013 | Kontomaris |
| 2013/0247597 A1 | 9/2013 | Kontomaris |
| 2015/0033770 A1 | 2/2015 | Minor |
| 2015/0152305 A1* | 6/2015 | Minor .............. C09K 5/045 62/77 |
| 2017/0174966 A1* | 6/2017 | Van Horn .............. C09K 5/045 |

OTHER PUBLICATIONS

Montzka, S.A., et al., Scientific Assessment of Ozone Depletion: 2002, A Report of the World Meteorological Association's Global Ozone Research and Monitoring Project, Section 1.4.4, pp. 1.28-1.31.

2006 ASHRAE® Handbook, Chapter 4, Secondary Coolants in Refrigeration Systems, pp. 4.1-4.6, American Society of Heating, Refrigerating and Air-Conditioning Engineers, Inc.

* cited by examiner

COMPOSITIONS COMPRISING DIFLUOROMETHANE, PENTAFLUOROETHANE, TETRAFLUOROPROPENE, AND TETRAFLUOROETHANE AND USES THEREOF

This application represents a national filing under 35 U.S.C. 371 of International Application No. PCT/US2014/059257 filed Oct. 6, 2014, and claims priority of U.S. Provisional Application No. 61/889,077 filed Oct. 10, 2013 and also claims priority of U.S. Provisional Application No. 61/911,114 filed Dec. 3, 2013.

FIELD OF THE INVENTION

This invention relates to compositions, methods and systems having utility in numerous applications, and in particular, in heat pumps, including high temperature heat pumps, and air conditioning, including air conditioning for high ambient temperature environments.

BACKGROUND OF THE INVENTION

The compositions of the present invention are part of a continued search for the next generation of low global warming potential materials. Such materials must have low environmental impact, as measured by low global warming potential and zero or negligible ozone depletion potential. New air conditioning and heat pump working fluids are needed.

Heating is required in a wide range of applications, including space heating, water heating for domestic or other service, food drying, process heating, etc. Presently this heating is mostly provided through heaters using fossil fuels (e.g. heavy oil, natural gas etc.). Thus working fluids that can provide heating in energy efficient heat pumps are needed.

Air conditioning is needed for residential and larger sized buildings. In particular in regions with high ambient temperatures, not all refrigerants will provide the needed energy efficiency. Thus, new low GWP refrigerants and working fluids are needed for air conditioning.

SUMMARY OF THE INVENTION

This disclosure relates to air conditioning and heat pump systems and methods using compositions comprising difluoromethane; pentafluoroethane; 1,1,2,2-tetrafluoroethane and/or 1,1,1,2-tetrafluoroproene; and 2,3,3,3-tetrafluoropropene and/or E-1,3,3,3-tetrafluoropropene, as the working fluid.

In accordance with the present invention a composition is provided. The composition comprises (a) from 1 to 29 weight percent difluoromethane; (b) from 1 to 19 weight percent pentafluoroethane; (c) from 9 to 42 weight percent 1,1,2,2-tetrafluoroethane, 1,1,1,2-tetrafluoroethane, or a mixture thereof; and (d) from 34 to 68 weight percent 2,3,3,3-tetrafluoropropene, E-1,3,3,3-tetrafluoropropene or mixture thereof; wherein when the composition contains 2,3,3,3-tetrafluoropropene, the composition also contains at least some 1,1,2,2-tetrafluoroethane; wherein the ratio of component (a) to component (b) is at most 1.5:1; and wherein the ratio of component (c) to component (d) is at least 0.04:1.

The compositions are useful in methods for producing cooling and heating, methods for producing air conditioning, methods for replacing HCFC-22, R-410A, R-407C, HFC-134a, CFC-12, and HCFC-124 and in heat transfer systems including heat pumps and air conditioners. In particular, the compositions are useful in methods and apparatus for heating in high temperature heat pumps and air conditioning in high ambient environments.

DETAILED DESCRIPTION OF PREFERRED EMBODIMENTS

Figure 1:
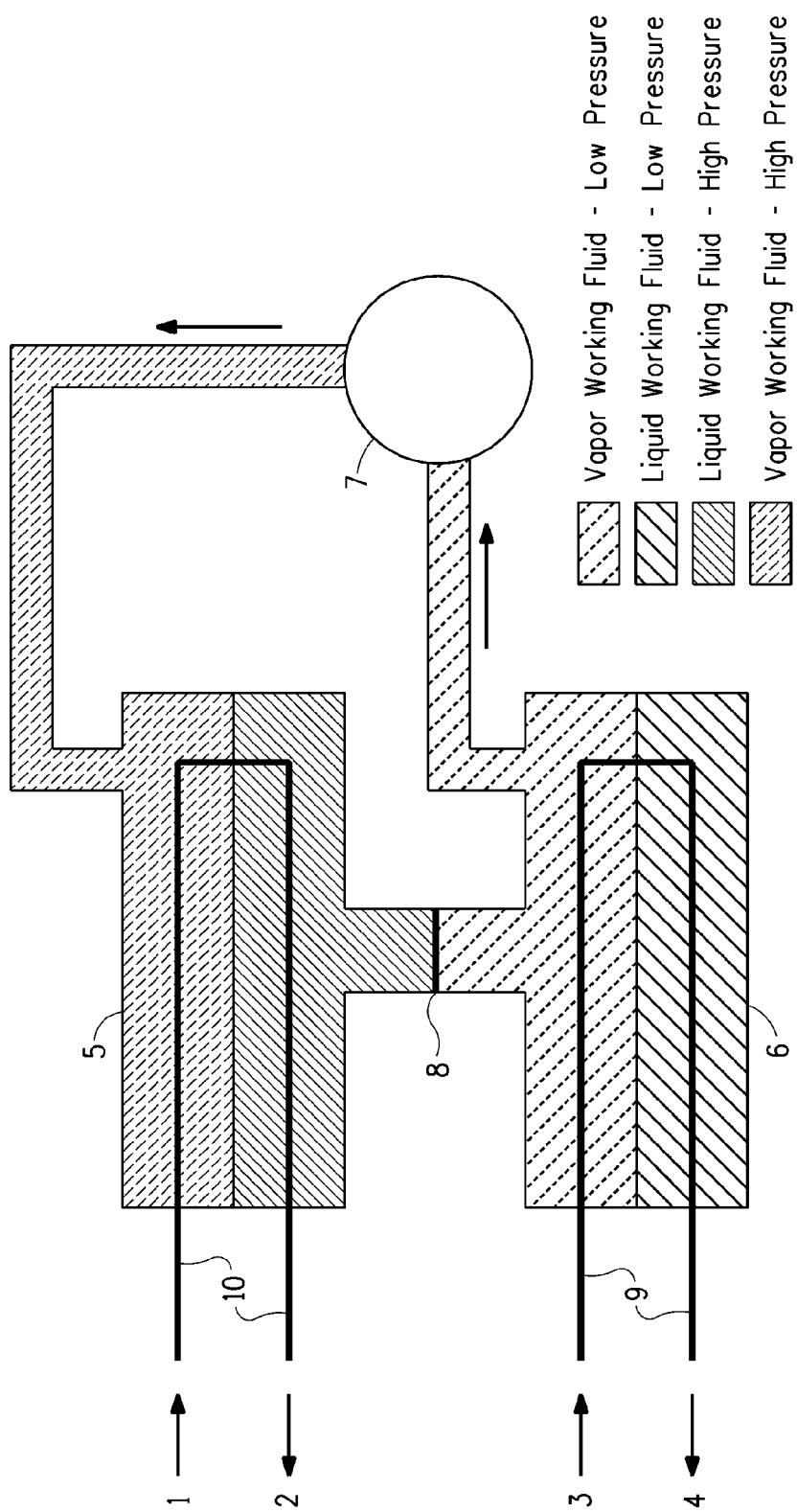
FIG. 1 is a schematic diagram of one embodiment of a flooded evaporator heat pump apparatus which utilizes a composition comprising difluoromethane; pentafluoroethane; 1,1,2,2-tetrafluoroethane and/or 1,1,1,2-tetrafluoroethane; and 2,3,3,3-tetrafluoropropene and/or E-1,3,3,3-tetrafluoropropene as working fluid.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant in an evaporator per unit mass of refrigerant circulated. Volumetric cooling capacity refers to the amount of heat removed by the refrigerant in the evaporator per unit volume of refrigerant vapor exiting the evaporator. The refrigeration capacity is a measure of the ability of a refrigerant or heat transfer composition to produce cooling. Cooling rate refers to the heat removed by the refrigerant in the evaporator per unit time.

Similarly, volumetric heating capacity is a term to define the amount of heat supplied by the refrigerant or working fluid in the condenser per unit volume of refrigerant or working fluid vapor entering the compressor. The higher the volumetric heating capacity of the refrigerant or working fluid, the greater the heating rate that is produced at the condenser with the maximum volumetric flow rate achievable with a given compressor.

Coefficient of performance (COP) is the amount of heat removed in the evaporator divided by the energy required to operate the compressor. The higher the COP, the higher the energy efficiency of a working fluid in a system. COP is directly related to the energy efficiency ratio (EER), that is, the efficiency rating for refrigeration or air conditioning equipment at a specific set of internal and external temperatures.

As used herein, a heat transfer medium comprises a composition used to carry heat from a heat source (e.g. from a body to be cooled) to the heat pump working fluid heater (e.g. evaporator) or from the heat pump working fluid cooler (e.g. condenser or a supercritical working fluid cooler) to a body to be heated.

As used herein, a working fluid comprises a compound or mixture of compounds that function to transfer heat in a cycle wherein the working fluid undergoes a phase change from a liquid to a vapor and back to a liquid in a repeating cycle.

Subcooling is the reduction of the temperature of a liquid below that liquid's saturation point for a given pressure. The saturation point is the temperature at which a vapor composition is just completely condensed to a liquid (also referred to as the bubble point). But subcooling continues to cool the liquid to a lower temperature liquid at the given pressure. Subcool amount is the amount of cooling below the saturation temperature (in degrees) or how far below its saturation temperature a liquid composition is cooled.

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition.

As used herein a heat exchanger is a component of a heat pump or air conditioning apparatus wherein heat is transferred. A heat exchanger may be a working fluid cooler (e.g., condenser), wherein heat is transferred from the working fluid to a heat transfer medium or to or from air for comfort heating or cooling or a body to be heated or cooled. When the working fluid undergoes condensation during cooling, the working fluid cooler is a condenser. A heat exchanger may be a working fluid heater (e.g., evaporator), wherein heat is transferred to the working fluid. When the working fluid undergoes evaporation during a heating or cooling cycle, the working fluid heater is an evaporator.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic or novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" is employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Difluoromethane (HFC-32 or R32) is commercially available or may be made by methods known in the art, such as by dechlorofluorination of methylene chloride.

Pentafluoroethane (HFC-125 or R125) is commercially available or may be made by methods known in the art, such as dechlorofluorination of 2,2-dichloro-1,1,1-trifluoroethane as described in U.S. Pat. No. 5,399,549, incorporated herein by reference.

1,1,1,2-tetrafluoroethane (HFC-134a, $CF_3CH_2F$) is available commercially from many refrigerant producers and distributors or may be prepared by methods known in the art. HFC-134a may be made by the hydrogenation of 1,1-dichloro-1,1,1,2-tetrafluoroethane (i.e., $CCl_2FCF_3$ or CFC-114a) to 1,1,1,2-tetrafluoroethane. Additionally, 1,1,2,2-tetrafluoroethane (HFC-134, $CHF_2CHF_2$) may be made by the hydrogenation of 1,2-dichloro-1,1,2,2-tetrafluoroethane (i.e., $CClF_2CClF_2$ or CFC-114) to 1,1,2,2-tetrafluoroethane.

E-1,3,3,3-tetrafluoropropene (E-HFO-1234ze or trans-HFO-1234ze) may be prepared by dehydrofluorination of a 1,1,1,2,3-pentafluoropropane (HFC-245eb, $CF_3CHFCH_2F$) or 1,1,1,3,3-pentafluoropropane (HFC-245fa, $CF_3CH_2CHF_2$). The dehydrofluorination reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference. HFO-1234ze may exist as one of two configurational isomers, E- or Z- (also referred to as the trans- and cis-isomers respectively). E-HFO- 1234ze is available commercially from certain fluorocarbon manufacturers (e.g., Honeywell International Inc., Morristown, N.J.).

2,3,3,3-tetrafluoropropene may also be referred to as HFO-1234yf, HFC-1234yf, or R1234yf. HFO-1234yf may be made by methods known in the art, such as by dehydrofluorination 1,1,1,2,3-pentafluoropropane (HFC-245eb) or 1,1,1,2,2-pentafluoropropane (HFC-245cb). HFO-1234yf is also available commercially from certain fluorocarbon manufacturers (e.g., E.I. Du Pont de Nemours, Wilmington, Del.).

Compositions

In accordance with the present invention, a composition comprising difluoromethane, pentafluoroethane, tetrafluoroethane and tetrafluoropropene is provided. In one embodiment, the compositions comprise (a) from 1 to 29 weight percent difluoromethane; (b) from 1 to 19 weight percent pentafluoroethane; (c) from 9 to 42 weight percent 1,1,2,2-tetrafluoroethane, 1,1,1,2-tetrafluoroethane, or a mixture thereof; and (d) from 34 to 68 weight percent 2,3,3,3-tetrafluoropropene, E-1,3,3,3-tetrafluoropropene or mixture thereof; wherein when the composition contains 2,3,3,3-tetrafluoropropene, the composition also contains at least some 1,1,2,2-tetrafluoroethane; wherein the ratio of component (a) to component (b) is at most 1.5:1; and wherein the ratio of component (c) to component (d) is at least 0.0.04:1. In another embodiment, the ratio of component (c) to component (d) is at least 0.23:1. In another embodiment, the compositions consist of (a) difluoromethane, (b) pentafluoroethane, (c) 1,1,2,2-tetrafluoroethane and (d) E-1,3,3,3-tetrafluoropropene.

In another embodiment, the compositions consist of (a) difluoromethane, (b) pentafluoroethane, (c) 1,1,1,2-tetrafluoroethane and (d) E-1,3,3,3-tetrafluoropropene.

In another embodiment, the compositions consist of (a) difluoromethane, (b) pentafluoroethane, (c) 1,1,2,2-tetrafluoroethane and (d) 2,3,3,3-tetrafluoropropene.

In another embodiment, the compositions consist of (a) difluoromethane, (b) pentafluoroethane, (c) 1,1,2,2-tetrafluoroethane and 1,1,1,2-tetrafluoroethane, and (d) 2,3,3,3-tetrafluoropropene.

In one embodiment of the compositions comprising difluoromethane, pentafluoroethane, tetrafluoroethane and tetrafluoropropene, the ratio of component (a) to component (b) is at least 1:1. In another embodiment, the ratio of component (a) to component (b) ranges from 1:1 to 1.5:1.

In one embodiment of the compositions comprising difluoromethane, pentafluoroethane, tetrafluoroethane and tetrafluoropropene, the ratio of component (c) to component (d) is at most 0.80:1. In another embodiment, the ratio of component (c) to component (d) is from 0.04:1 to 0.80:1. In another embodiment, the ratio of component (c) to component (d) ranges from 0.23:1 to 0.80:1. In another embodiment, the ratio of component (c) to component (d) is from 0.04:1 to 0.23:1.

In one embodiment, the compositions provide volumetric heating capacity that is at least 105% of the volumetric heating capacity for HFC-134a at a set of cycle conditions representative of intended applications.

In one embodiment, the compositions are non-flammable as determined by ASTM-E681 at 60° C. Non-flammable refrigerants are desirable in some applications.

In one embodiment, the compositions have a GWP less than 1000.

In one embodiment, the compositions comprise (a) from 3 weight percent to 23 weight percent difluoromethane; (b) from 2 weight percent to 16 weight percent pentafluoroethane: (c) from 26 weight percent to 42 weight percent 1,1,2,2-tetrafluoroethane; and (d) from 34 weight percent to 53 weight percent 2,3,3,3-tetrafluoropropene. In another embodiment, the compositions consist of (a) difluoromethane, (b) pentafluoroethane, (c) 1,1,2,2-tetrafluoroethane and (d) 2,3,3,3-tetrafluoropropene.

In one embodiment, the compositions comprise (a) from 10 weight percent to 28 weight percent difluoromethane; (b) from 6 weight percent to 19 weight percent pentafluoroethane: (c) from 16 weight percent to 25 weight percent 1,1,2,2-tetrafluoroethane; and (d) from 38 weight percent to 58 weight percent E-1,3,3,3-tetrafluoropropene. In another embodiment, the compositions consist of (a) difluoromethane, (b) pentafluoroethane, (c) 1,1,2,2-tetrafluoroethane and (d) E-1,3,3,3-tetrafluoropropene.

In one embodiment, the compositions comprise (a) from 9 weight percent to 29 weight percent difluoromethane; (b) from 6 weight percent to 19 weight percent pentafluoroethane: (c) from 9 weight percent to 16 weight percent 1,1,1,2-tetrafluoroethane; and (d) from 42 weight percent to 68 weight percent E-1,3,3,3-tetrafluoropropene. In another embodiment, the compositions comprise (a) from 13 weight percent to 29 weight percent difluoromethane; (b) from 13 weight percent to 19 weight percent pentafluoroethane: (c) from 9 weight percent to 13 weight percent 1,1,1,2-tetrafluoroethane; and (d) from 44 weight percent to 65 weight percent E-1,3,3,3-tetrafluoropropene. In another embodiment, the compositions comprise (a) from 15 weight percent to 25 weight percent difluoromethane; (b) from 14 weight percent to 17 weight percent pentafluoroethane: (c) from 10 weight percent to 13 weight percent 1,1,1,2-tetrafluoroethane; and (d) from 45 weight percent to 61 weight percent E-1,3,3,3-tetrafluoropropene. In another embodiment, the compositions consist of (a) difluoromethane, (b) pentafluoroethane, (c) 1,1,1,2-tetrafluoroethane and (d) E-1,3,3,3-tetrafluoropropene. In one embodiment, the ratio of difluoromethane to pentafluoroethane is from 1.2:1 to 1.5:1. In another embodiment, the ratio of difluoromethane to pentafluoroethane is from 1.3:1 to 1.5:1.

In one embodiment, the compositions comprise (a) from 10-14 weight percent difluoromethane; (b) from 13-16 weight percent pentafluoroethane; (c) from 2-30 weight percent 1,1,2,2-tetrafluoroethane and 0-29 weight percent 1,1,1,2-tetrafluoroethane; and (d) 40-50 weight percent 2,3,3,3-tetrafluoropropene. In another embodiment, the compositions comprise (a) from 11-13 weight percent difluoromethane; (b) 14-15 weight percent pentafluoroethane; (c) 5-28 weight percent 1,1,2,2-tetrafluoroethane and 15-29 weight percent 1,1,1,2-tetrafluoroethane; and (d) 44-46 weight percent 2,3,3,3-tetrafluoropropene. In another embodiment, the compositions consist of (a) difluoromethane, (b) pentafluoroethane, (c) 1,1,2,2-tetrafluoroethane and 1,1,1,2-tetrafluoroethane, and (d) 2,3,3,3-tetrafluoropropene.

In certain embodiments, the refrigerant composition comprises difluoromethane, pentafluoroethane, 2,3,3,3-tetrafluoropropene and 1,1,2,2-tetrafluoroethane or mixtures of 1,1,2,2-tetrafluoroethane and 1,1,1,2-tetrafluoroethane, wherein the weight ratio of difluoromethane to pentafluoroethane ranges from 1:0.9 to 1:1.6 (which is the same as 1.11:1 to 0.62:1). In other embodiments, the weight ratio of difluoromethane to pentafluoroethane ranges from 1:1.20 to 1:1.4 (which is the same as 0.83:1 to 0.71:1).

In other embodiments, the refrigerant composition comprises difluoromethane, pentafluoroethane, 2,3,3,3-tetrafluoropropene and 1,1,2,2-tetrafluoroethane or mixtures of 1,1,2,2-tetrafluoroethane and 1,1,1,2-tetrafluoroethane, wherein the weight ratio of the total of 1,1,1,2-tetrafluoroethane and 1,1,2,2-tetrafluoroethane to 2,3,3,3-tetrafluoropropene ranges from 1:1.37 to 1:1.9 (which is the same as 0.73:1 to 0.52:1). In other embodiments, the weight ratio of the total of 1,1,1,2-tetrafluoroethane and 1,1,2,2-tetrafluoroethane to 2,3,3,3-tetrafluoropropene ranges from 1:1.4 to 1:1.6 (which is the same as 0.71:1 to 0.62:1).

In other embodiments, the refrigerant composition comprises difluoromethane; pentafluoroethane; 1,1,2,2-tetrafluoroethane; and 2,3,3,3-tetrafluoropropene, wherein the weight ratio of 1,1,2,2-tetrafluoroethane to 2,3,3,3-tetrafluoropropene ranges from 1:1.3 to 1:23 (which is the same as 0.77:1 to 0.043:1). In other embodiments, the weight ratio of 1,1,2,2-tetrafluoroethane to 2,3,3,3-tetrafluoropropene ranges from 1:5.5 to 1:10 (which is the same as 0.18:1 to 0.10:1).

In some embodiments, the refrigerant composition is non-flammable. In some embodiments the refrigerant composition has average glide of about 5 K or less when used in air conditioning equipment. In some embodiments, the refrigerant composition has global warming potential (GWP) less than about 1000. In some embodiments, the refrigerant composition is non-flammable and has average glide of about 5 K or less when used in air conditioning equipment. In some embodiments, the refrigerant composition is non-flammable and has global warming potential (GWP) less than about 1000. In some embodiments, the refrigerant composition has average glide of about 5 K or less when used in air conditioning equipment, and has global warming potential (GWP) less than about 1000. In some embodiments, the refrigerant composition is non-flammable, has average glide of about 5 K or less when used in air conditioning equipment, and has global warming potential (GWP) less than about 1000.

In some embodiments, in addition to the difluoromethane, pentafluoroethane, tetrafluoroethane, and tetrafluoropropene, the disclosed compositions may comprise optional non-refrigerant components.

In some embodiments, the optional non-refrigerant components (also referred to herein as additives) in the compositions disclosed herein may comprise one or more components selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

The compositions comprising difluoromethane, pentafluoroethane, tetrafluoroethane and tetrafluoropropene may also comprise and/or be used in combination with at least one lubricant selected from the group consisting of polyalkylene glycols, polyol esters, polyvinylethers, mineral oils, alkylbenzenes, synthetic paraffins, synthetic naphthenes, and poly(alpha)olefins.

Useful lubricants include those suitable for use with high temperature heat pump apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

Useful lubricants may also include those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants are selected by considering a given compressor's requirements and the environment to which the lubricant will be exposed.

Of note are high temperature lubricants with stability at high temperatures. The highest temperature the heat pump will achieve will determine which lubricants are required. In one embodiment, the lubricant must be stable at temperatures of at least 50° C. In another embodiment, the lubricant must be stable at temperatures of at least 75° C. In another embodiment, the lubricant must be stable at temperatures of at least 100° C. In another embodiment, the lubricant must be stable at temperatures of at least 125° C. In another embodiment, the lubricant must be stable at temperatures of at least 150° C. In another embodiment, the lubricant must be stable at temperatures of at least 155° C. In another embodiment, the lubricant must be stable at temperatures of at least 175° C. In another embodiment the lubricant must be stable at temperatures of at least 200° C.

Of particular note are poly alpha olefin (POA) lubricants with stability up to about 200° C. and polyol ester (POE) lubricants with stability at temperatures up to about 200 to 220° C. Also of particular note are perfluoropolyether lubricants that have stability at temperatures from about 220 to about 350° C. PFPE lubricants include those available from DuPont (Wilmington, Del.) under the trademark Krytox®, such as the XHT series with thermal stability up to about 300 to 350° C. Other PFPE lubricants include those sold under the trademark Demnum™ from Daikin Industries (Japan) with thermal stability up to about 280 to 330° C., and available from Ausimont (Milan, Italy), under the trademarks Fomblin® and Galden® such as that available under the trademark Fomblin®-Y Fomblin®-Z with thermal stability up to about 220 to 260° C.

For operation of cycles exposing the working fluid to high temperatures (e.g. cycles associated with high temperature lifts and high compressor discharge temperatures) formulations of working fluid (e.g. working fluids comprising difluoromethane, pentafluoroethane, tetrafluoroethane and tetrafluoropropene) and lubricants with high thermal stability (possibly in combination with oil cooling or other mitigation approaches) will be advantageous. For operation with high temperature lift, multi-stage compression with inter-stage fluid injection (e.g. where part of the liquid refrigerant leaving the working fluid cooler (e.g., condenser) is expanded to an intermediate pressure between compression stages to at least partially desuperheat the vapors leaving the first compression stage) may be preferred. In one embodiment, the compositions may further comprise from about 0.01 weight percent to about 5 weight percent of a stabilizer, (e.g., a free radical scavenger, an acid scavenger or an antioxidant) to prevent degradation caused at high temperatures. Such other additives include but are not limited to, nitromethane, hindered phenols, hydroxylamines, thiols, phosphites, or lactones. Of note are compositions wherein the compositions comprise from about 0.1 weight percent to about 3 weight percent of a stabilizer. Single stabilizers or combinations may be used.

Optionally, in another embodiment, certain refrigeration, air-conditioning, or heat pump system additives may be added, as desired, to the working fluids as disclosed herein in order to enhance performance and system stability. These additives are known in the field of refrigeration and air-conditioning, and include, but are not limited to, anti-wear agents, extreme pressure lubricants, corrosion and oxidation inhibitors, metal surface deactivators, free radical scavengers, and foam control agents. In general, these additives may be present in the working fluids in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP); Lubrizol 1375 and other members of this family of chemicals may be used in compositions of the present invention. Other anti-wear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulphonates. Metal surface deactivators include areoxalyl bis (benzylidene) hydrazide, N,N'-bis(3,5-di-tert-butyl-4-hydroxyhydrocinnamoylhydrazine, 2,2'-oxamidobis-ethyl-(3, 5-di-tert-butyl-4-hydroxyhydrocinnamate, N,N'-(disalicyclidene)-1,2-diaminopropane and ethylenediaminetetraacetic acid and its salts, and mixtures thereof.

Of note are stabilizers to prevent degradation at temperatures of 50° C. or above. Also of note are stabilizers to prevent degradation at temperatures of 75° C. or above. Also of note are stabilizers to prevent degradation at temperatures of 85° C. or above. Also of note are stabilizers to prevent degradation at temperatures of 100° C. or above. Also of note are stabilizers to prevent degradation at temperatures of 118° C. or above. Also of note are stabilizers to prevent degradation at temperatures of 137° C. or above. Also of note are stabilizers to prevent degradation at temperatures of 150° C. or above. Also of note are stabilizers to prevent degradation at temperatures of 175° C. or above. Also of note are stabilizers to prevent degradation at temperatures of 200° C. or above.

Of note are stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and iso-decyl diphenyl phosphite, commercially available from Ciba under the trademark Irgafos® DDPP; anisole; 1,4-dimethoxybenzene; 1,4-diethoxybenzene; 1,3, 5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy) methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

Also of note are ionic liquid stabilizers comprising at least one ionic liquid. Ionic liquids are organic salts that are liquid or have melting points below 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and F—. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

The compositions of the present invention can be prepared by any convenient method including mixing or combining the desired amounts. In one embodiment of this invention, a composition can be prepared by weighing the desired component amounts and thereafter combining them in an appropriate container.

Heat Pump Methods

In accordance with this invention, a method for producing heating in a heat pump is provided. The method comprises extracting heat from a working fluid, in a working fluid cooler (which may be a condenser), thereby producing a cooled working fluid; wherein said working fluid comprises (a) from 1 to 29 weight percent difluoromethane; (b) from 1 to 19 weight percent pentafluoroethane; (c) from 9 to 42 weight percent 1,1,2,2-tetrafluoroethane, (d) 1,1,1,2-tetrafluoroethane, or a mixture thereof; and from 34 to 68 weight percent 2,3,3,3-tetrafluoropropene, E-1,3,3,3-tetrafluoropropene or mixture thereof. In one embodiment of the method for producing heating in a heat pump, the heat pump is a high temperature heat pump wherein the working fluid cooler, where heat is extracted from the working fluid, is operated at temperatures higher than about 50° C. In another embodiment of the method, the working fluid cooler, where heat is extracted from the working fluid, is operated at temperatures higher than about 65° C. In another embodiment of the method, the working fluid cooler, where heat is extracted from the working fluid, is operated at temperatures higher than about 75° C. In another embodiment of the method, the working fluid cooler, where heat is extracted from the working fluid, is operated at temperatures higher than about 100° C. In another embodiment of the method, the working fluid cooler, where heat is extracted from the working fluid, is operated at temperatures higher than about 125° C. In another embodiment of the method, the working fluid cooler, where heat is extracted from the working fluid, is operated at temperatures higher than about 150° C. In another embodiment of the method, the working fluid cooler, where heat is extracted from the working fluid, is operated at temperatures higher than about 175° C. In another embodiment of the method, the working fluid cooler, where heat is extracted from the working fluid, is operated at temperatures higher than about 200° C.

In certain embodiments of the method, the working fluid cooler is a condenser. Thus a method is provided for producing heating in a heat pump comprising condensing a vapor working fluid comprising difluoromethane, pentafluoroethane, tetrafluoroethane and tetrafluoropropene, in a condenser, thereby producing a liquid working fluid. Of note are methods wherein a vapor working fluid consisting essentially of difluoromethane, pentafluoroethane, 1,1,2,2-tetrafluoroethane and E-1,3,3,3-tetrafluoropropene is condensed. In another embodiment, the working fluid consists of difluoromethane, pentafluoroethane, tetrafluoroethane and tetrafluoropropene. In another embodiment, the working fluid consists of difluoromethane, pentafluoroethane, 1,1,2,2-tetrafluoroethane and 2,3,3,3-tetrafluoropropene. In another embodiment, the working fluid consists of difluoromethane, pentafluoroethane, 1,1,1,2-tetrafluoroethane and E-1,3,3,3-tetrafluoropropene. In another embodiment the working fluid contains both 1,1,2,2-tetrafluoroethane and 1,1,1,2-tetrafluoroethane. In another embodiment, the working fluid contains both E-1,3,3,3-tetrafluoropropene and 2,3,3,3-tetrafluoropropene. In this conventional cycle the working fluid pressure is kept below the critical pressure of the working fluid throughout the entire cycle.

Further, in another embodiment, low GWP working fluids are desirable in the method for producing heating in a heat pump. Of note are working fluids comprising (a) from 1 to 29 weight percent difluoromethane; (b) from 1 to 19 weight percent pentafluoroethane; (c) from 9 to 42 weight percent 1,1,2,2-tetrafluoroethane, (d) 1,1,1,2-tetrafluoroethane, or a mixture thereof; and from 34 to 68 weight percent 2,3,3,3-tetrafluoropropene, E-1,3,3,3-tetrafluoropropene or mixture thereof, which have GWP less than 1000 that are useful in the methods of the present invention.

In another embodiment, working fluids of use in the method for producing heating comprise (a) from 3 weight percent to 23 weight percent difluoromethane; (b) from 2 weight percent to 16 weight percent pentafluoroethane: (c) from 26 weight percent to 42 weight percent 1,1,2,2-tetrafluoroethane; and (d) from 34 weight percent to 53 weight percent 2,3,3,3-tetrafluoropropene. In another embodiment, the working fluids consist of (a) difluoromethane, (b) pentafluoroethane, (c) 1,1,2,2-tetrafluoroethane and (d) 2,3,3,3-tetrafluoropropene.

In another embodiment, working fluids of use in the method for producing heating comprise (a) from 10 weight percent to 28 weight percent difluoromethane; (b) from 6 weight percent to 19 weight percent pentafluoroethane: (c) from 16 weight percent to 25 weight percent 1,1,2,2-tetrafluoroethane; and (d) from 38 weight percent to 58 weight percent E-1,3,3,3-tetrafluoropropene. In another embodiment, the working fluids consist of (a) difluoromethane, (b) pentafluoroethane, (c) 1,1,2,2-tetrafluoroethane and (d) E-1,3,3,3-tetrafluoropropene.

In another embodiment, working fluids of use in the method for producing heating comprise (a) from 9 weight percent to 29 weight percent difluoromethane; (b) from 6 weight percent to 19 weight percent pentafluoroethane: (c) from 9 weight percent to 16 weight percent 1,1,1,2-tetrafluoroethane; and (d) from 42 weight percent to 68 weight percent E-1,3,3,3-tetrafluoropropene. In another embodiment, the working fluids consist of (a) difluoromethane, (b) pentafluoroethane, (c) 1,1,1,2-tetrafluoroethane and (d) E-1,3,3,3-tetrafluoropropene.

In another embodiment, working fluids of use in the method for producing heating comprise (a) from 10-14 weight percent difluoromethane; (b) from 13-16 weight percent pentafluoroethane; (c) from 2-30 weight percent 1,1,2,2-tetrafluoroethane and 0-29 weight percent 1,1,1,2-tetrafluoroethane; and (d) 40-50 weight percent 2,3,3,3-tetrafluoropropene. In another embodiment, the working fluids comprise (a) from 11-13 weight percent difluoromethane; (b) 14-15 weight percent pentafluoroethane; (c) 5-28 weight percent 1,1,2,2-tetrafluoroethane and 15-29 weight percent 1,1,1,2-tetrafluoroethane; and (d) 44-46 weight percent 2,3,3,3-tetrafluoropropene. In another embodiment, the working fluids consist of (a) difluoromethane, (b) pentafluoroethane, (c) 1,1,2,2-tetrafluoroethane and 1,1,1,2-tetrafluoroethane, and (d) 2,3,3,3-tetrafluoropropene.

The method for producing heating may further comprise passing a first heat transfer medium through the working fluid cooler whereby said extraction of heat from the working fluid heats the first heat transfer medium, and passing the heated first heat transfer medium from the working fluid cooler to a body to be heated.

In the methods for producing heating in a heat pump a body to be heated may be any space, object, process stream or fluid that may be heated. In one embodiment, a body to be heated may be a room, an apartment, or building, such as an apartment building, university dormitory, townhouse, or other attached house or single family home, office building, supermarket, college or university classroom or administration buildings. In another embodiment, the body to be heated may be the passenger compartment of an automobile. Alternatively, in another embodiment, a body to be heated may be a secondary loop fluid, heat transfer medium or heat transfer fluid.

In one embodiment, the first heat transfer medium is water and the body to be heated is water. In another embodiment, the first heat transfer medium is water and the body to be heated is air for space heating. In another embodiment, the first heat transfer medium is an industrial heat transfer liquid and the body to be heated is a chemical process stream. In another embodiment, the first heat transfer medium is water and the body to be heated is air for drying or dehumidification.

In another embodiment of the method for producing heating, the method further comprises expanding the cooled working fluid and heating the expanded cooled working fluid in a heater. In some embodiments, wherein the cooled working fluid is expanded to a pressure below the critical pressure of the working fluid, the heater is an evaporator. Thus, in another embodiment, the method for producing heating further comprises expanding the cooled working fluid and heating the working fluid in an working fluid heater (which may be an evaporator), thus producing a working fluid vapor.

In yet another embodiment, the method to produce heating further comprises compressing the working fluid vapor in a dynamic (e.g. axial or centrifugal) compressor or a positive displacement (e.g. reciprocating, screw or scroll) compressor. The compression step may compress the working fluid vapor to a pressure below or above the critical pressure of the working fluid. If the compression step compresses the working fluid from a pressure below the critical pressure of the working fluid to a pressure above the critical pressure of the working fluid, then the cycle may be referred to as a trans-critical cycle.

In one embodiment, the heating is produced in a heat pump comprising said working fluid cooler, further comprising passing a first heat transfer medium to be heated through said working fluid cooler, thus heating the first heat transfer medium. In one embodiment, the first heat transfer medium is air, and is passed from the working fluid cooler to a space to be heated. In another embodiment, the first heat transfer medium is a portion of a process stream, and is passed from the working fluid cooler back to the process.

In some embodiments, the first heat transfer medium may be selected from water or glycol (such as ethylene glycol or propylene glycol). Of particular note is an embodiment wherein the first heat transfer medium is water extracting heat from a body to be cooled such as air for space cooling.

In another embodiment, a heat transfer medium may be an industrial heat transfer liquid, wherein the body to be heated is a chemical process stream, which includes process lines and process equipment such as distillation columns. In another embodiment, a heat transfer medium may be an industrial heat transfer liquid, wherein the body to be heated is a chemical process stream, which includes process equipment such as chemical reactors, dryers, crystallizers, evaporators, boilers and liquid pumps. Of note are industrial heat transfer liquids including ionic liquids, various brines such as aqueous calcium chloride or sodium chloride, glycols such as propylene glycol or ethylene glycol, methanol, ammonia, trichloroethylene, d-limonene, methylene chloride and other heat transfer media such as those listed in section 4 of the 2006 ASHRAE Handbook on Refrigeration.

In one embodiment of this method, the working fluid is heated in a working fluid heater (which may be an evaporator) by a second heat transfer medium to form a heated working fluid. The second heat transfer medium is a warm liquid, such as water, which is transported into the working fluid heater from a low temperature heat source. The warm second heat transfer medium is cooled in the working fluid heater and is returned to the low temperature heat source or is passed to a body to be cooled, such as a building. The heated working fluid is then compressed in a compressor to produce a high pressure working fluid. The high pressure working fluid is then cooled in a working fluid cooler by a first heat transfer medium, which is a cooled liquid brought in from the vicinity of a body to be heated (heat sink). In this method a heat pump may also be used to heat domestic or service water or a process stream. In this method a heat pump may also be used to heat water for district heating. In another embodiment, the heat pump is a high temperature heat pump, thus having a working fluid cooler (e.g. condenser, when being used in a subcritical cycle) temperature above about 50° C. In yet another embodiment, the heat pump is a high temperature heat pump, thus having a working fluid cooler (e.g. condenser) temperature above about 75° C. In yet another embodiment, the heat pump is a high temperature heat pump, thus having a working fluid cooler (e.g. condenser) temperature above about 100° C.

In another embodiment, of the method for producing heating a liquid working fluid is passed to a working fluid heater (which may be an evaporator when used in a sub-critical cycle) where it is heated by a second liquid heat transfer medium thus being evaporated to produce a heated working fluid vapor. The second liquid heat transfer medium is cooled by heating the working fluid and passed out of the working fluid heater to a low temperature heat source or a body to be cooled. The heated working fluid vapor is then compressed in a compressor to produce a high pressure working fluid vapor. The high pressure working fluid vapor is then cooled in a working fluid cooler by a first heat transfer medium, which is a cooled liquid brought in from the vicinity of a body to be heated (heat sink) thus forming a cooled working fluid liquid. In this method, a heat pump may also be used to heat domestic or service water or a process stream. In this method a heat pump may also be used to heat water for district heating. In another embodiment the heat pump is a high temperature heat pump, thus having a condenser temperature above about 50° C. In another embodiment, the heat pump is a high temperature heat pump, thus having a working fluid cooler (e.g. condenser) temperature above about 75° C. In yet another embodiment, the heat pump is a high temperature heat pump, thus having a working fluid cooler (e.g. condenser) temperature above about 100° C.

In one embodiment of the method for producing heating, the heat pump includes a compressor which is a dynamic or positive displacement compressor. Dynamic compressors include axial and centrifugal compressors. Positive displacement compressors include reciprocating, screw and scroll.

The conventional heating cycle described above in which the working fluid pressure does not exceed the working fluid critical pressure may be referred to as a sub-critical heating cycle. In a sub-critical heating cycle liquid working fluid is evaporated in the evaporator (a heat exchanger or working fluid heater) and condensed in the condenser (a different heat exchanger or working fluid cooler), thus transitioning between liquid and vapor working fluid repeatedly as the cycle repeats.

In a trans-critical heating cycle the working fluid used in the cycle receives heat (or it can be said to be heated) at a pressure below the critical pressure of the working fluid by evaporating in a working fluid heater (corresponding to the evaporator of a sub-critical cycle). The working fluid vapor is then compressed to a pressure greater than the critical pressure of the working fluid and then cooled without condensation in a working fluid cooler (corresponding to the condenser in a sub-critical cycle) thus releasing heat to produce a cooled working fluid. The pressure of this cooled working fluid is reduced below its critical pressure. Thus, the working fluid pressure exceeds its critical pressure for only some portion of (but not throughout) the cycle.

A super-critical heating cycle operates at pressures higher than the critical pressure of the working fluid throughout the entire cycle and involves the following steps: working fluid compression, cooling, expansion and heating.

In another embodiment of the invention, a method for producing heating in a heat pump wherein heat is exchanged between at least two cascade heating stages is provided. The method comprises absorbing heat in a first working fluid at a selected lower temperature in a first cascade heating stage and transferring this heat to a second working fluid of a second cascade heating stage that rejects heat at a higher working fluid temperature; wherein at least one of the first working fluid or the second working fluid comprises a composition containing difluoromethane, pentafluoroethane, tetrafluoroethane and tetrafluoropropene. Multiple stage heat pump systems (or cascade heat pump systems) allow low temperature heat to be raised to higher levels by stepping the heat up through more than one cycle or cascade stage.

The maximum feasible operating working fluid cooler (or condenser) temperature is dependent upon the properties of the working fluid used (e.g. temperature at which the rate of fluid chemical decomposition, isomerization or other chemical change becomes unacceptably high; the fluid critical temperature; the fluid saturation pressure) as well as certain equipment limitations (e.g. maximum design working pressure or maximum permitted compressor discharge temperature). The present compositions could enable raising the temperature of heat delivered at the fluid cooler (e.g. condenser) of heat pumps originally designed for and/or operated with other working fluids having lower critical temperatures or higher pressures, such as HCFC-22, R-410A, R-407C, or HFC-134a.

In accordance with this invention it is possible to replace a high temperature heat pump working fluid (for example, in a system originally designed for said high temperature heat pump working fluid) with a working fluid comprising difluoromethane, pentafluoroethane, tetrafluoroethane and tetrafluoropropene. Thus is provided a method for replacing HCFC-22, R-410A, R-407C, HFC-134a, or CFC-12 working fluid in a high temperature heat pump designed for said working fluid providing a replacement working fluid comprising difluoromethane, pentafluoroethane, tetrafluoroethane and tetrafluoropropene. In another embodiment, the method comprises providing a replacement working fluid consisting essentially of difluoromethane, pentafluoroethane, tetrafluoroethane and tetrafluoropropene. In another embodiment, the method comprises providing a replacement working fluid consisting of difluoromethane, pentafluoroethane, tetrafluoroethane and tetrafluoropropene. In one embodiment of the method for replacing HCFC-22, R-410A, R-407C, HFC-134a, or CFC-12, said heat pump is a high temperature heat pump having a working fluid cooler or condenser operating temperature above about 50° C. In another embodiment of the method the heat pump is a high temperature heat pump having a working fluid cooler or condenser operating temperature above about 75° C. In another embodiment of the method the heat pump is a high temperature heat pump having a working fluid cooler or condenser operating temperature above about 100° C.

In one embodiment, a method for supplying simultaneous heating and cooling in a cascade heat pump system is provided. In one embodiment, the method comprises providing a low temperature cascade stage (or lower stage) containing a working fluid selected from the group consisting of HFO-1234yf, HFO-1243zf, HFO-1234ze-E, HFC-32, HFC-125, HFC-143a, HFC-134a, HFC-134, HFC-152a, HFC-245cb, propylene, propane, cyclo-propane, $CO_2$, $NH_3$ and their mixtures; and providing a high temperature cascade stage containing a working fluid comprising difluoromethane, pentafluoroethane, tetrafluoroethane and tetrafluoropropene of the present invention; wherein said low temperature cascade stage and said high temperature cascade stage are in thermal contact.

In another embodiment, the method comprises providing a low temperature cascade stage (lower stage) containing a working fluid comprising difluoromethane, pentafluoroethane, tetrafluoroethane and tetrafluoropropene of the present invention, and providing a high temperature cascade stage containing a working fluid selected from the group consisting of isobutane, n-butane, neopentane, cyclobutane, isopentane, n-pentane, cyclo-pentane, HCFO-1233xf, HCFO-1233zd-E, HCFO-1233zd-Z, HFC-245cb, HFC-134, HFC-227ca, HFC-227ea, HFC-236ca, HFC-236ea, HFC-245fa, HFC-245eb, HFC-356mff, HFC-245ca, HFC-245ea, HFC-365mfc, HFC-43-10mee, HFE-7000, HFE-E347mcc, HFO-1225ye-E, HFO-1234yc, HFO-1234ye-E, HFO-1336mcyf, HFO-1243yf, HFO-1336mzz-E, HFO-1234ze-Z, HFO-1234ze-E, HFO-1438mzz-E, HFO-1336mzz-Z, HFO-1243ye-E, HFO-1438mzz-Z and their blends; wherein said low temperature cascade stage and said high temperature cascade stage are in thermal contact.

In accordance with this invention it is also possible to use a working fluid comprising difluoromethane, pentafluoroethane, tetrafluoroethane and tetrafluoropropene in a system originally designed as a chiller using a conventional chiller working fluid (for example a chiller using HFC-134a or HCFC-22 or HFC-245fa) for the purpose of converting the system to a heat pump system. For example, a conventional chiller working fluid can be replaced in an existing chiller system with a working fluid comprising difluoromethane, pentafluoroethane, tetrafluoroethane and tetrafluoropropene to achieve this purpose.

In accordance with this invention it is also possible to use a working fluid comprising difluoromethane, pentafluoroethane, tetrafluoroethane and tetrafluoropropene in a system originally designed as a chiller using a chiller working fluid containing an HFO (e.g. HFO-1234yf or E-HFO-1234ze) for the purpose of converting the system to a heat pump system. For example, a chiller working fluid containing an HFO can be replaced in an existing chiller system with a working fluid comprising difluoromethane, pentafluoroethane, tetrafluoroethane and tetrafluoropropene to achieve this purpose.

In accordance with this invention it is also possible to use a working fluid comprising difluoromethane, pentafluoroethane, tetrafluoroethane and tetrafluoropropene in a system originally designed as a comfort heating (i.e., low temperature or residential) heat pump system using a conventional comfort heating heat pump working fluid (for example a heat pump using HFC-134a, HCFC-22, R-410A or R-407C) for the purpose of converting the system to a high temperature heat pump system having condenser temperatures at about 50° C. or higher. For example, a conventional comfort heating heat pump working fluid can be replaced in an existing comfort heating heat pump system with a working fluid comprising difluoromethane, pentafluoroethane, tetrafluoroethane and tetrafluoropropene to achieve this purpose.

A working fluid comprising difluoromethane, pentafluoroethane, tetrafluoroethane and tetrafluoropropene can enable the design and operation of dynamic (e.g. centrifugal) or positive displacement (e.g. screw or scroll) heat pumps for upgrading heat available at low temperatures to meet demands for heating at higher temperatures. The available low temperature heat would be supplied to the evaporator and the high temperature heat would be extracted at the condenser. For example, waste heat could be available to be supplied to the evaporator of a heat pump operating at 25° C. at a location (e.g. a hospital) where heat from the condenser, operating at 85° C., could be used to heat water (e.g. for hydronic space heating or other service).

In some cases heat may be available from various other sources (e.g. waste heat from process streams, geothermal heat or solar heat) at temperatures higher than suggested above, while heating at even higher temperatures may be required. For example, waste heat may be available at 75° C. while heating at 130° C. may be required for an industrial application. The lower temperature heat could be supplied to the working fluid heater (e.g., evaporator) of a dynamic (e.g. centrifugal) or positive displacement heat pump to be uplifted to the desired temperature of 130° C. and be delivered at the working fluid cooler Air-conditioning Methods In one embodiment is provided a method for producing cooling comprising evaporating a composition comprising difluoromethane, pentafluoroethane, tetrafluoroethane and tetrafluoropropene in the vicinity of a body to be cooled and thereafter condensing said composition. In another embodiment, the method for producing cooling is particularly useful in regions where the ambient temperature can exceed at least 35° C.

In geographic areas with high ambient temperatures, where air conditioning becomes essential, refrigerant compositions with high critical temperatures and high thermal stability are desirable. Currently available hydrofluorocarbon (HFC) refrigerants such as R-410A, R-407C or R-32 have relatively low critical temperatures. As a consequence, these refrigerants do not perform well in hot environments. The energy efficiency of a refrigerant generally decreases as the condensing temperature approaches the refrigerant critical temperature during operation at high ambient temperatures. Additionally, R-32 is an ASHRAE (American Society of Heating, Refrigeration and Air-conditioning Engineers) Class 2L flammable gas subject to use limitations for certain applications in certain regions imposed by current building and safety codes. In hot climates, R-22 has remained the refrigerant of choice for much air conditioning and refrigeration applications as it is not flammable and has a higher critical temperature so that it delivers higher cooling capacity and higher energy efficiency in hot climates as compared to R-410A or R-32. However, R-22 is an ozone depleting substance in the Montreal Protocol to reduce ozone depletion. As such, R-22 has been mandated and legislated for phase out for manufacture for and use in air conditioning and refrigeration. There is interest in finding a refrigerant with the lowest possible direct GWP, but meeting the basic safety requirements of nonflammability and low toxicity and also that performs well in hot climate (or high ambient) temperature regions.

In the method for producing cooling the body to be cooled may be defined as any space, location, object or body for which it is desirable to provide cooling. Examples include spaces, open or enclosed, that require cooling such as a residence, such as an apartment or apartment building, university dormitory, townhouse or other attached house, or a single family home; or the body to be cooled may be any other building, such as an office building, supermarket, college or university classroom or administration buildings.

In another embodiment, a method for producing air conditioning in high ambient temperatures is provided. The method comprises evaporating a composition comprising difluoromethane, pentafluoroethane, tetrafluoroethane and tetrafluoropropene and thereafter condensing said composition. The method is particularly useful in regions where ambient temperatures can exceed 35° C. or more.

In another embodiment, a method is provided for replacing HCFC-22 in high ambient air conditioning apparatus comprising providing a composition comprising difluoromethane, pentafluoroethane, tetrafluoroethane and tetrafluoropropene to said apparatus. The method of replacing HCFC-22 is particularly useful in regions where ambient temperatures can exceed 35° C. or more.

Similarly, in some industrial air conditioning applications heat must be released in high ambient temperature environments. HCFC-124 has been used as the working fluid in such applications. HCFC-124 is also controlled under the Montreal protocol as an ozone depleting substance and more environmentally sustainable replacements are desirable. Thus, a method is provided for replacing HCFC-124 in industrial air conditioning apparatus, comprising providing a composition comprising difluoromethane, pentafluoroethane, tetrafluoroethane and tetrafluoropropene to said apparatus. The method of replacing HCFC-124 is particularly useful in regions where ambient temperatures can exceed 35° C. or more.

In another embodiment, the method for producing cooling and method for replacing HCFC-22 or HCFC-124 are useful for systems operating in ambient temperatures of 40° C. or higher. In another embodiment, the method for producing cooling is useful for systems operating in ambient temperatures of 45° C. or higher. In another embodiment, the method for producing cooling is useful for systems operating in ambient temperatures of 50° C. or higher. In another embodiment, the method for producing cooling is useful for systems operating in ambient temperatures of 55° C. or higher. In another embodiment, the method for producing cooling is useful for systems operating in ambient temperatures of 60° C. or higher. In another embodiment, the method for producing cooling is useful for systems operating in ambient temperatures from 35-50° C. In another embodiment, the method for producing cooling is useful for systems operating in ambient temperatures from 35-60° C. In another embodiment, the method for producing cooling is useful for systems operating in ambient temperatures from 40-60° C. In another embodiment, the method for producing cooling is useful for systems operating in ambient temperatures from 45-60° C. In another embodiment, the method for producing cooling is useful for systems operating in ambient temperatures from 50-60° C.

Heat Transfer Systems

In one embodiment, a heat transfer system is provided. The heat transfer system comprises an evaporator, compressor, working fluid cooler (e.g., condenser) and an expansion device; and said heat transfer system contains a composition comprising difluoromethane, pentafluoroethane, tetrafluoroethane and tetrafluoropropene. In another embodiment, the heat transfer system contains a composition consisting essentially of difluoromethane, pentafluoroethane, tetrafluoroethane and tetrafluoropropene. In another embodiment, the heat transfer system contains a composition consisting of difluoromethane, pentafluoroethane, tetrafluoroethane and tetrafluoropropene.

In one embodiment, the heat transfer system is a heat pump apparatus. In one embodiment the heat transfer system is a high temperature heat pump. High temperature heat pumps can produce maximum working fluid cooler (e.g., condenser) operating temperatures greater than about 50° C.

In one embodiment of the present invention is provided a high temperature heat pump apparatus containing a working fluid comprising difluoromethane, pentafluoroethane, tetrafluoroethane and tetrafluoropropene. Also of note are embodiments wherein the working fluid consists essentially of difluoromethane, pentafluoroethane, tetrafluoroethane and tetrafluoropropene. Also of note are embodiments wherein the working fluid consists of difluoromethane, pentafluoroethane, tetrafluoroethane and tetrafluoropropene.

A heat pump is a type of apparatus for producing heating and/or cooling. The heat pump comprises a working fluid heater (e.g., evaporator), a compressor, a working fluid cooler (e.g., condenser), and an expansion device. A working fluid circulates through these components in a repeating cycle. Heating may be produced at the working fluid cooler (e.g., condenser) where energy (in the form of heat) is extracted from the working fluid as it is cooled to form cooled working fluid. Cooling may be produced at the working fluid heater (e.g., evaporator) where energy is absorbed to heat (and mostly, evaporate) the working fluid to form heated working fluid (mostly working fluid vapor). The embodiment wherein the working fluid is condensed and evaporated may be referred to as a sub-critical cycle and an apparatus used for such a sub-critical cycle includes an evaporator, a compressor, a condenser, and an expansion device as described above.

In a trans-critical heating cycle the working fluid liquid used in the cycle receives heat in an evaporator and evaporates at a pressure below the critical pressure of the working fluid. Then the heated working fluid vapor is compressed to a pressure above its critical pressure. The working fluid then enters the working fluid cooler as a fluid above its critical pressure and it is cooled (without condensation) to produce a cooled working fluid. After the cooled working fluid has exited the cooler, its pressure is reduced to a pressure below its critical pressure. The working fluid in a trans-critical cycle, therefore, is at a pressure higher than its critical pressure for a portion of the cycle and at a pressure lower than its critical pressure for another portion of the cycle.

In a super-critical heating cycle the working fluid used in the cycle receives heat in a heater at a pressure higher than the critical pressure of the working fluid. The working fluid is then compressed to an even higher pressure and cooled in a working fluid cooler thus releasing heat. Then the pressure of the working fluid is reduced to the heater pressure and therefore, the working fluid pressure remains higher than the working fluid critical pressure. Thus the pressure of the working fluid remains higher than its critical pressure throughout the super-critical cycle.

Figure 2:
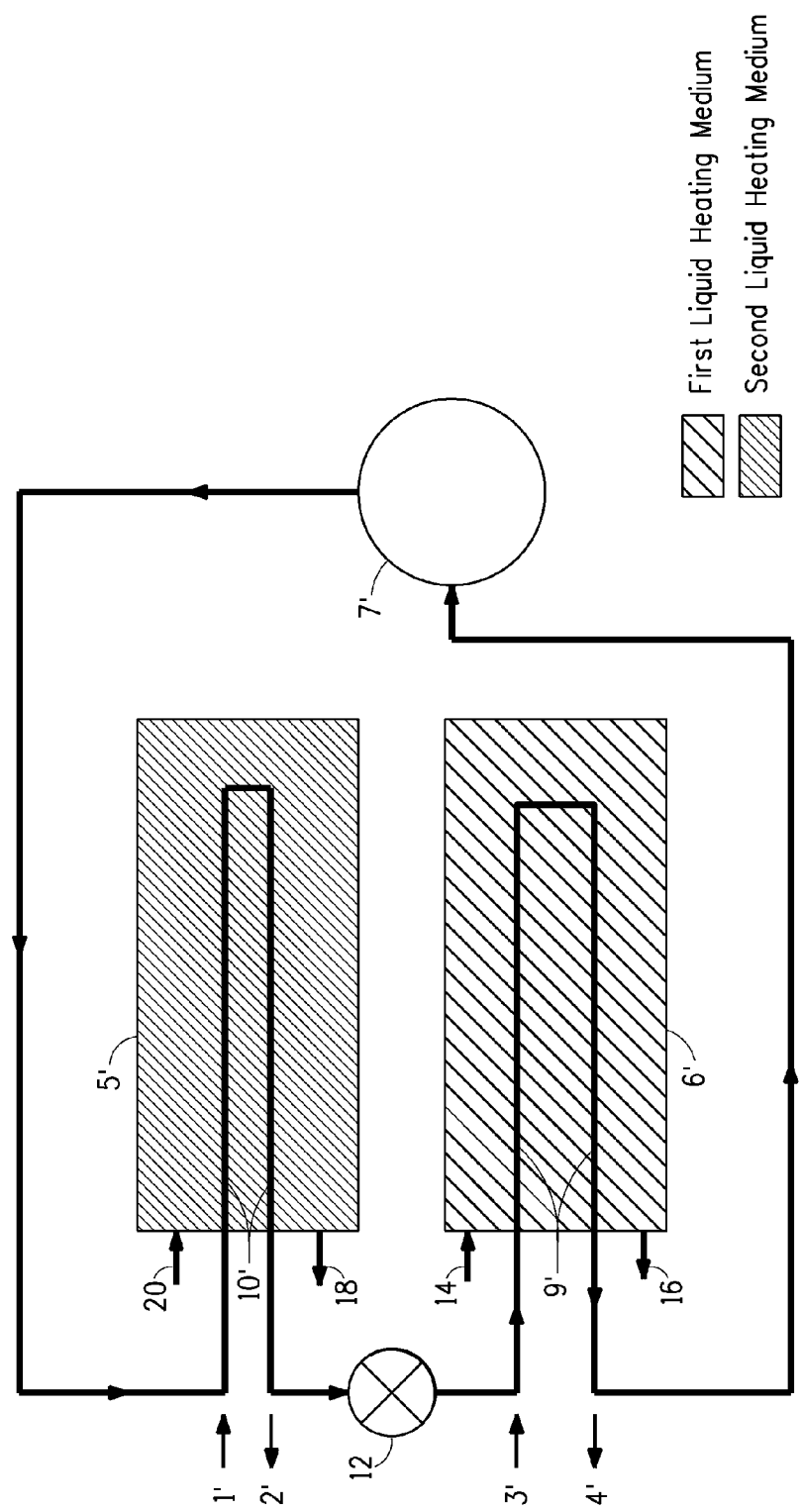
FIG. 2 is a schematic diagram of one embodiment of a direct expansion heat pump apparatus which utilizes a composition comprising difluoromethane; pentafluoroethane; 1,1,2,2-tetrafluoroethane and/or 1,1,1,2-tetrafluoroethane; and 2,3,3,3-tetrafluoropropene and/or E-1,3,3,3-tetrafluoropropene as working fluid.

Heat pumps may include flooded evaporators, one embodiment of which is shown in FIG. 1, or direct expansion evaporators, one embodiment of which is shown in FIG. 2.

Heat pumps may utilize positive displacement compressors or dynamic compressors. Positive displacement compressors include reciprocating, screw, and scroll compressors. Of note are heat pumps that use screw compressors. Dynamic compressors include axial and centrifugal compressors. Also of note are heat pumps that use centrifugal compressors.

Residential heat pumps are used to produce heated air to warm a residence or home (including single family or multi-unit attached homes) and produce maximum condenser operating temperatures from about 30° C. to about 50° C.

Of note are high temperature heat pumps that may be used to heat air, water, another heat transfer medium or some portion of an industrial process, such as a piece of equipment, storage area or process stream. These high temperature heat pumps can produce maximum working fluid cooler (e.g., condenser) operating temperatures greater than about 50° C. The maximum working fluid cooler (e.g., condenser) operating temperature that can be achieved in a high temperature heat pump will depend upon the working fluid used. This maximum working fluid cooler (e.g., condenser) operating temperature is limited by the normal boiling characteristics of the working fluid and also by the pressure to which the heat pump's compressor is designed to raise the vapor working fluid pressure. The maximum permitted design working pressure also limits the maximum operating temperature for any working fluid used in the heat pump.

Of particular value are high temperature heat pumps that operate at working fluid cooler (e.g., condenser) temperatures of at least about 50° C. Compositions comprising difluoromethane, pentafluoroethane, tetrafluoroethane and tetrafluoropropene enable the design and operation of centrifugal or positive displacement heat pumps, operated at working fluid cooler (e.g., condenser) temperatures comparable to or higher than those accessible with many working fluids currently in use. Of note are embodiments using working fluids comprising difluoromethane, pentafluoroethane, tetrafluoroethane and tetrafluoropropene operated at working fluid cooler (e.g., condenser) temperatures up to about 65° C. Also of note are embodiments using working fluids comprising difluoromethane, pentafluoroethane, tetrafluoroethane and tetrafluoropropene operated at working fluid cooler (e.g., condenser) temperatures up to about 75° C. Also of note are embodiments using working fluids comprising difluoromethane, pentafluoroethane, tetrafluoroethane and tetrafluoropropene operated at working fluid cooler (e.g., condenser) temperatures up to about 100° C. Also of note are embodiments using working fluids comprising difluoromethane, pentafluoroethane, tetrafluoroethane and tetrafluoropropene operated at working fluid cooler temperatures up to about 125° C. Also of note are embodiments using working fluids comprising difluoromethane, pentafluoroethane, tetrafluoroethane and tetrafluoropropene operated at working fluid cooler temperatures up to about 150° C. Also of note are heat pumps that are used to produce heating and cooling simultaneously. For instance, a single heat pump unit may produce hot water for domestic use and may also produce cooling for comfort air conditioning in the summer.

Heat pumps, including both flooded and direct expansion evaporator, may be coupled with an air handling and distribution system to provide comfort air conditioning (cooling and dehumidifying the air) and/or heating to residences (single family or attached homes) and large commercial buildings, including hotels, office buildings, hospitals, universities and the like. In another embodiment, high temperature heat pumps may be used to heat water. In another embodiment, high temperature heat pumps may be used to heat multi-family residential buildings (e.g. high rise apartment buildings).

To illustrate how high temperature heat pumps operate, reference is made to the Figures. A flooded evaporator type heat pump is shown in FIG. 1. In this heat pump a second heat transfer medium, which is a warm liquid, which comprises water, and, in some embodiments, additives, or other heat transfer media such as a glycol (e.g., ethylene glycol or propylene glycol), enters the heat pump carrying heat from a low temperature source, such as a building air handling system or warmed-up water from condensers of a chiller plant flowing to the cooling tower, shown entering at arrow 3, through a tube bundle or coil 9, in an evaporator 6, which has an inlet and an outlet. The warm second heat transfer medium is delivered to the evaporator, where it is cooled by liquid working fluid, which is shown in the lower portion of the evaporator. The liquid working fluid evaporates at a lower temperature than the warm second heat transfer medium which flows through tube bundle or coil 9. The cooled second heat transfer medium re-circulates back to the low temperature heat source as shown by arrow 4, via a return portion of tube bundle or coil 9. The liquid working fluid, shown in the lower portion of evaporator 6 in FIG. 1, vaporizes and is drawn into a compressor 7, which increases the pressure and temperature of the working fluid vapor. The compressor compresses this working fluid vapor so that it may be condensed in a condenser 5 at a higher pressure and temperature than the pressure and temperature of the working fluid vapor when it exits the evaporator. A first heat transfer medium enters the condenser via a tube bundle or coil 10 in condenser 5 from a location where high temperature heat is provided ("heat sink") such as a domestic or service water heater or a hydronic heating system at arrow 1 in FIG. 1. The first heat transfer medium is warmed in the process and returned via a return loop of tube bundle or coil 10 and arrow 2 to the heat sink. This first heat transfer medium cools the working fluid vapor in the condenser and causes the vapor to condense to liquid working fluid, so that there is liquid working fluid in the lower portion of the condenser as shown in FIG. 1. The condensed liquid working fluid in the condenser flows back to the evaporator through an expansion device 8, which may be an orifice, capillary tube or expansion valve. Expansion device 8 reduces the pressure of the liquid working fluid, and converts the liquid working fluid partially to vapor, that is to say that the liquid working fluid flashes as pressure drops between the condenser and the evaporator. Flashing cools the working fluid, i.e., both the liquid working fluid and the working fluid vapor to the saturated temperature at evaporator pressure, so that both liquid working fluid and working fluid vapor are present in the evaporator.

While the description of FIG. 1 above pertains to subcritical heat pump cycles, embodiments wherein the cycle is a trans-critical heat pump cycle or a super-critical heat pump cycle are intended to fall within the scope of the present invention. In a trans-critical cycle, the condenser would be replaced with a working fluid cooler and the working fluid would be cooled in the cooler without condensation. In a super-critical cycle, the condenser would be replaced with a working fluid cooler and the working fluid would be cooled in the cooler without condensation; and also the evaporator would be replaced with a working fluid heater and the working fluid would be heated in the heater without evaporation. In some embodiments the working fluid vapor is compressed to a supercritical state and vessel 5 in FIG. 1 represents a gas cooler where the working fluid vapor is cooled to a liquid state without condensation.

In some embodiments the second heat transfer medium used in the apparatus depicted in FIG. 1 is chilled water returning from a building where air conditioning is provided or from some other body to be cooled. Heat is extracted from the returning second heat transfer medium at the evaporator 6 and the cooled second heat transfer medium is supplied back to the building or other body to be cooled. In this embodiment the apparatus depicted in FIG. 1 functions to simultaneously cool the second heat transfer medium that provides cooling to a body to be cooled (e.g. building air) and heat the first heat transfer medium that provides heating to a body to be heated (e.g. domestic or service water or process stream).

It is understood that the apparatus depicted in FIG. 1 can extract heat at the evaporator 6 from a wide variety of heat sources including solar, geothermal and waste heat and supply heat from the condenser 5 to a wide range of heat sinks.

One embodiment of a direct expansion heat pump is illustrated in FIG. 2. In the heat pump as illustrated in FIG. 2, liquid second heat transfer medium, which is a warm liquid, such as warm water, enters an evaporator 6' at inlet 14. Mostly liquid working fluid (with a small amount of working fluid vapor) enters a coil 9' in the evaporator at arrow 3' and evaporates. As a result, liquid second heat transfer medium is cooled in the evaporator, and a cooled liquid second heat transfer medium exits the evaporator at outlet 16, and is sent to a low temperature heat source (e.g. warm water flowing to a cooling tower). The working fluid vapor exits the evaporator at arrow 4' and is sent to a compressor 7', where it is compressed and exits as high temperature, high pressure working fluid vapor. This working fluid vapor enters a condenser 5' through a condenser coil or tube bundle 10' at 1'. The working fluid vapor is cooled by a liquid first heat transfer medium, such as water, in the condenser and becomes a liquid. The liquid first heat transfer medium enters the condenser through a condenser heat transfer medium inlet 20. The liquid first heat transfer medium extracts heat from the condensing working fluid vapor, which becomes liquid working fluid, and this warms the liquid first heat transfer medium in the condenser. The liquid first heat transfer medium exits from the condenser through the condenser heat transfer medium outlet 18. The condensed working fluid exits the condenser through lower coil or tube bundle 10' as shown in FIG. 2 and flows through an expansion device 12, which may be an orifice, capillary tube or expansion valve. Expansion device 12 reduces the pressure of the liquid working fluid. A small amount of vapor, produced as a result of the expansion, enters the evaporator with liquid working fluid through coil 9' and the cycle repeats.

In some embodiments the working fluid vapor is compressed to a supercritical state and vessel 5' in FIG. 2 represents a gas cooler where the working fluid vapor is cooled to a liquid state without condensation.

In some embodiments the second heat transfer medium used in the apparatus depicted in FIG. 2 is chilled water returning from a building where air conditioning is provided or from some other body to be cooled. Heat is extracted from the returning second heat transfer medium at the evaporator 6' and the cooled second heat transfer medium is supplied back to the building or other body to be cooled. In this embodiment the apparatus depicted in FIG. 2 functions to simultaneously cool the second heat transfer medium that provides cooling to a body to be cooled (e.g. building air) and heat the first heat transfer medium that provides heating to a body to be heated (e.g. domestic or service water or process stream).

It is understood that the apparatus depicted in FIG. 2 can extract heat at the evaporator 6' from a wide variety of heat sources including solar, geothermal and waste heat and supply heat from the condenser 5' to a wide range of heat sinks.

Compressors useful in the present invention include dynamic compressors. Of note as examples of dynamic compressors are centrifugal compressors. A centrifugal compressor uses rotating elements to accelerate the working fluid radially, and typically includes an impeller and diffuser housed in a casing. Centrifugal compressors usually take working fluid in at an impeller eye, or central inlet of a rotating impeller, and accelerate it radially outward. Some static pressure rise occurs in the impeller section, but most of the pressure rise occurs in the diffuser section, where velocity is converted to pressure. Each impeller-diffuser set is a compressor stage. Centrifugal compressors are built with from 1 to 12 or more compressor stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its tip and is related to the diameter of the impeller and its revolutions per minute. The tip speed required in a specific application depends on the compressor work that is required to elevate the thermodynamic state of the working fluid from evaporator to condenser conditions. The volumetric flow capacity of the centrifugal compressor is determined by the size of the passages through the impeller. This makes the size of the compressor more dependent on the pressure required than the volumetric flow capacity required.

Also of note as examples of dynamic compressors are axial compressors. A compressor in which the fluid enters and leaves in the axial direction is called an axial flow compressor. Axial compressors are rotating, airfoil- or blade-based compressors in which the working fluid principally flows parallel to the axis of rotation. This is in contrast with other rotating compressors such as centrifugal or mixed-flow compressors where the working fluid may enter axially but will have a significant radial component on exit. Axial flow compressors produce a continuous flow of compressed gas, and have the benefits of high efficiencies and large mass flow capacity, particularly in relation to their cross-section. They do, however, require several rows of airfoils to achieve large pressure rises making them complex and expensive relative to other designs.

Compressors useful in the present invention also include positive displacement compressors. Positive displacement compressors draw vapor into a chamber, and the chamber decreases in volume to compress the vapor. After being compressed, the vapor is forced from the chamber by further decreasing the volume of the chamber to zero or nearly zero.

Of note as examples of positive displacement compressors are reciprocating compressors. Reciprocating compressors use pistons driven by a crankshaft. They can be either stationary or portable, can be single or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (above 5000 psi or 35 MPa).

Also of note as examples of positive displacement compressors are screw compressors. Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (above 1200 psi or 8.3 MPa).

Also of note as examples of positive displacement compressors are scroll compressors. Scroll compressors are similar to screw compressors and include two interleaved spiral-shaped scrolls to compress the gas. The output is more pulsed than that of a rotary screw compressor.

In one embodiment, the heat pump apparatus may comprise more than one heating circuit (or loop or stage). The performance (coefficient of performance for heating and volumetric heating capacity) of heat pumps operated with difluoromethane, pentafluoroethane, tetrafluoroethane and tetrafluoropropene as the working fluid is drastically improved when the working fluid heater is operated at temperatures approaching the working fluid cooler temperature required by the application.

When heat is available at temperatures relatively close (e.g. within about 50° C.) to the temperature at which heating is required, a single stage (or single loop) heat pump operating with difluoromethane, pentafluoroethane, tetrafluoroethane and tetrafluoropropene may be preferred. For example, heat at 75° C. from a process or a low grade geothermal source may be uplifted with a single stage heat pump operating with difluoromethane, pentafluoroethane, tetrafluoroethane and tetrafluoropropene to meet a heating demand at 90° C.

When the heat available is at temperatures substantially lower than the temperature at which heating is required (e.g., by more than 75° C.), a heat pump with two or more stages in a cascade configuration may be preferred. In one embodiment, working fluids comprising difluoromethane, pentafluoroethane, tetrafluoroethane and tetrafluoropropene may be used in the upper cascade. In this embodiment, the low temperature cascade stage (or cycle) would contain a working fluid selected from the group consisting of $CO_2$, HFC-32, R-410A (a mixture of 50 weight percent HFC-32 and 50 weight percent HFC-125), mixtures of HFC-32 and HFO-1234yf, and mixtures of HFC-32 and E-HFO-1234ze. The preferred working fluid for the lower temperature cascade stage(s) would depend on the temperature of the available heat source. In another embodiment, the upper cascade stage (or cycle) would contain a working fluid selected from the group consisting of E-HFO-1234ze, Z-HFO-1234ze, E-HFO-1336mzz (E-1,1,1,4,4,4,-hexafluoro-2-butene), Z-HFO-1336mzz (Z-1,1,1,4,4,4,-hexafluoro-2-butene), mixtures of E-HFO-1234ze and HFC-134, E-HCFO-1233zd (E-1-chloro-3,3,3-tetrafluoropropene), and HFC-245fa (1,1,3,3,3-pentafluoropropane); and the lower temperature cascade stage (or cycle) would contain a working fluid comprising difluoromethane, pentafluoroethane, tetrafluoroethane and tetrafluoropropene.

In another embodiment, for low temperature heat sources (e.g. ambient winter air) working fluids with low boiling points (or equivalently high vapor pressures) such as $CO_2$, $N_2O$, HFC-32, HFC-125, HFC-143a, HFC-227ea, HFO-1234yf, E-HFO-1234ze, HFO-1243zf, HFC-134a, HFC-134, HFC-161, HFC-152a and their blends would be advantageous. For example, heat from ambient winter air at $-10°$ C. may be uplifted to produce hot water at 65-85° C. for domestic or other service using a two-stage cascade heat pump with working fluids comprising difluoromethane, pentafluoroethane, tetrafluoroethane and tetrafluoropropene in the upper cascade stage and a lower cascade stage working fluid selected from HFC-32, $CO_2$, R-410A, mixtures of HFC-32 and HFO-1234yf, and mixtures of HFC-32 and E-HFO-1234ze. The low temperature circuit (or low temperature loop or cascade stage) of the cascade cycle receives the available low temperature heat at the evaporator, lifts the received heat to a temperature intermediate between the temperature of the available low temperature heat and the higher temperature of the required heating duty and transfers the heat to the high stage or high temperature circuit (or high temperature loop) of the cascade system at a cascade heat exchanger. Then the high temperature circuit, operated with difluoromethane, pentafluoroethane, tetrafluoroethane and tetrafluoropropene, further lifts the heat received at the cascade heat exchanger to the required working fluid cooler temperature to meet the intended heating duty. The cascade concept can be extended to configurations with three or more circuits lifting heat over wider temperature ranges and using different fluids over different temperature sub-ranges to optimize performance.

Therefore in accordance with the present invention, there is provided a heat pump apparatus having at least two heating stages arranged as a cascade heating system, each stage circulating a working fluid therethrough, wherein heat is transferred to a final stage from the preceding stage and wherein at least one working fluid in one of the stages comprises difluoromethane, pentafluoroethane, tetrafluoroethane and tetrafluoropropene. In another embodiment of the heat pump apparatus having at least two heating stages, the working fluid in one of the stages consists essentially of difluoromethane, pentafluoroethane, tetrafluoroethane and tetrafluoropropene. In another embodiment of the heat pump apparatus having at least two heating stages, the working fluid in one of the stages consists of difluoromethane, pentafluoroethane, tetrafluoroethane and tetrafluoropropene.

In one embodiment, the lower cascade stage (or lower temperature loop) of a two-stage cascade heat pump operating with a working fluid as described above could provide refrigeration while the higher stage operating with difluoromethane, pentafluoroethane, tetrafluoroethane and tetrafluoropropene could simultaneously provide heating. Thus there is provided a method for supplying simultaneous heating and cooling in a cascade heat pump system comprising providing a low temperature cascade stage containing a working fluid selected from the group consisting of $CO_2$, HFC-32, R-404A; mixtures of HFC-32 and HFO-1234yf, mixtures of HFC-32 and E-HFO-1234ze; and providing a high temperature cascade stage containing a working fluid comprising difluoromethane, pentafluoroethane, tetrafluoroethane and tetrafluoropropene.

Figure 3:
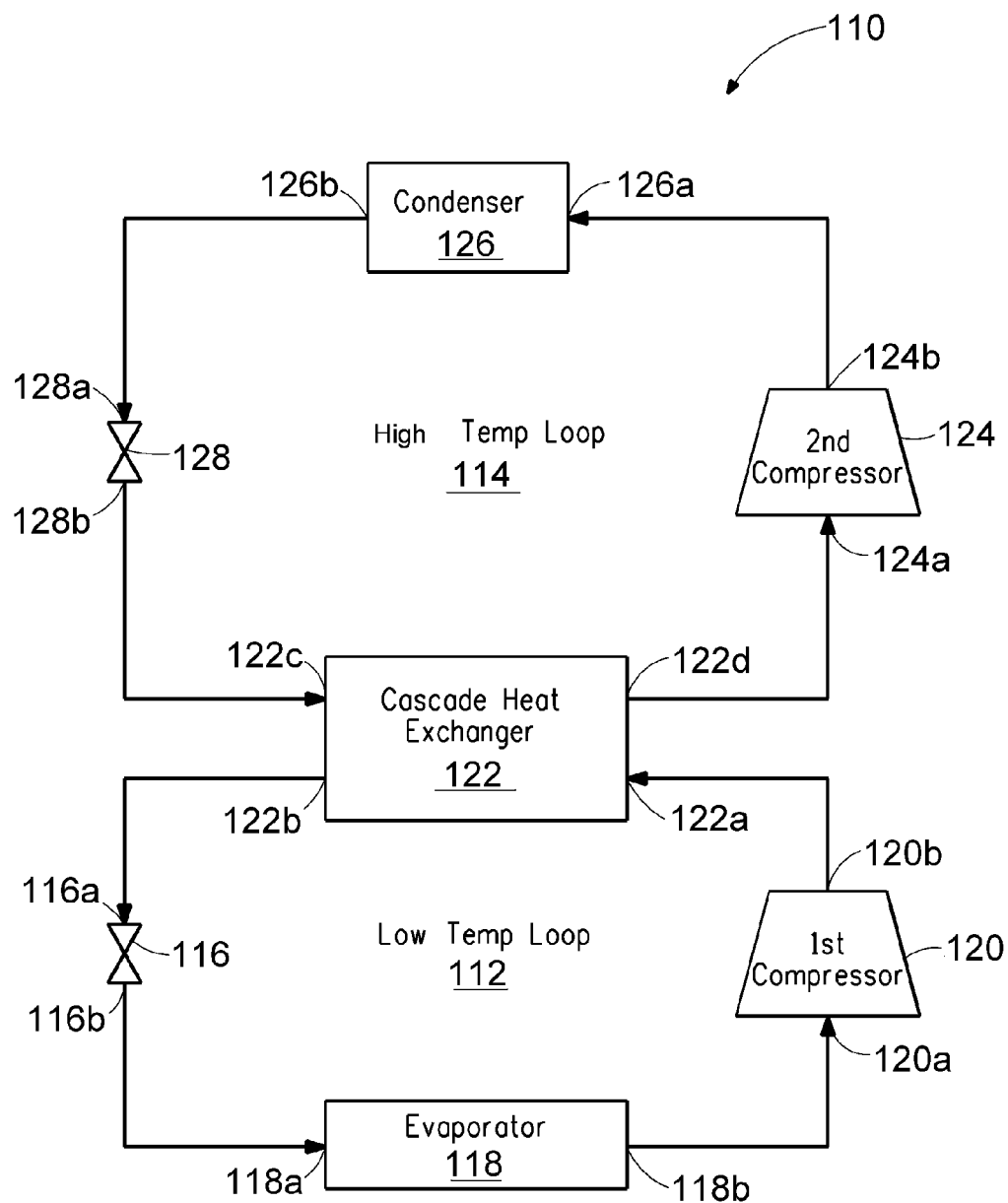
FIG. 3 is a schematic diagram of a cascade heat pump system which uses a composition comprising difluoromethane; pentafluoroethane; 1,1,2,2-tetrafluoroethane and/or 1,1,1,2-tetrafluoroethane; and 2,3,3,3-tetrafluoropropene and/or E-1,3,3,3-tetrafluoropropene as working fluid in at least one stage.

In accordance with the present invention, there is provided a cascade heat pump system having at least two heating loops for circulating a working fluid through each loop. One embodiment of such a cascade system is shown generally at 110 in FIG. 3. The cascade heat pump system of the present invention has at least two loops, including a first, or lower loop 112 as shown in FIG. 3, which is a low temperature loop, and a second, or upper loop 114 as shown in FIG. 3, which is a high temperature loop 114. Each circulates a working fluid therethrough.

As shown in FIG. 3, the cascade heat pump system includes a first expansion device 116. The first expansion device has an inlet 116a and an outlet 116b. The first expansion device reduces the pressure and temperature of a first working fluid liquid which circulates through the first or low temperature loop.

The cascade heat pump system shown in FIG. 3 also includes an evaporator 118. The evaporator has an inlet 118a and an outlet 118b. The first working fluid liquid from the first expansion device enters the evaporator through the evaporator inlet and is evaporated in the evaporator to form a first working fluid vapor. The first working fluid vapor then circulates to the outlet of the evaporator.

The cascade heat pump system shown in FIG. 3 also includes a first compressor 120. The first compressor has an inlet 120a and an outlet 120b. The first working fluid vapor from the evaporator circulates to the inlet of the first compressor and is compressed, thereby increasing the pressure and the temperature of the first working fluid vapor. The compressed first working fluid vapor then circulates to the outlet of the first compressor.

The cascade heat pump system shown in FIG. 3 also includes a cascade heat exchanger system 122. The cascade heat exchanger has a first inlet 122a and a first outlet 122b. The first working fluid vapor from the first compressor enters the first inlet of the heat exchanger and is condensed in the cascade heat exchanger to form a first working fluid liquid, thereby rejecting heat. The first working fluid liquid then circulates to the first outlet of the cascade heat exchanger. The cascade heat exchanger also includes a second inlet 122c and a second outlet 122d. A second working fluid liquid circulates from the second inlet to the second outlet of the cascade heat exchanger and is evaporated to form a second working fluid vapor, thereby absorbing the heat rejected by the first working fluid (as it is condensed). The second working fluid vapor then circulates to the second outlet of the cascade heat exchanger. Thus, in the embodiment of FIG. 3, the heat rejected by the first working fluid is directly absorbed by the second working fluid. The cascade heat pump system shown in FIG. 3 also includes a second compressor 124. The second compressor has an inlet 124a and an outlet 124b. The second working fluid vapor from the cascade heat exchanger is drawn into the compressor through the inlet and is compressed, thereby increasing the pressure and temperature of the second working fluid vapor. The second working fluid vapor then circulates to the outlet of the second compressor.

The cascade heat pump system shown in FIG. 3 also includes a condenser 126 having an inlet 126a and an outlet 126b. The second working fluid from the second compressor circulates from the inlet and is condensed in the condenser to form a second working fluid liquid, thus producing heat. The second working fluid liquid exits the condenser through the outlet.

The cascade heat pump system shown in FIG. 3 also includes a second expansion device 128 having an inlet 128a and an outlet 128b. The second working fluid liquid passes through the second expansion device, which reduces the pressure and temperature of the second working fluid liquid exiting the condenser. This liquid may be partially vaporized during this expansion. The reduced pressure and temperature second working fluid liquid circulates to the second inlet of the cascade heat exchanger system from the expansion device.

Moreover, in the event that working fluids comprising difluoromethane, pentafluoroethane, tetrafluoroethane and tetrafluoropropene are chemically stable at temperatures higher than their critical temperature, then these working fluids enable the design of heat pumps operated according to a supercritical and/or transcritical cycle in which heat is rejected by the working fluid in a supercritical state and made available for use over a range of temperatures (including temperatures higher than the critical temperature of a working fluid comprising difluoromethane, pentafluoroethane, tetrafluoroethane and tetrafluoropropene). The supercritical fluid is cooled to a liquid state without passing through an isothermal condensation transition.

For high temperature condenser operation (associated with high temperature lifts and high compressor discharge temperatures) formulations of working fluid (e.g. mixtures of difluoromethane, pentafluoroethane, tetrafluoroethane and tetrafluoropropene) and lubricants with high thermal stability (possibly in combination with oil cooling or other mitigation approaches) could be advantageous.

For high temperature condenser operation (associated with high temperature lifts and high compressor discharge temperatures) the use of magnetic centrifugal compressors (e.g. Danfoss-Turbocor type) that do not require the use of lubricants could be advantageous.

For high temperature condenser operation (associated with high temperature lifts and high compressor discharge temperatures) the use of compressor materials (e.g. shaft seals, etc) with high thermal stability may also be required.

In another embodiment, the heat transfer system may be an air conditioning system.

Vapor-compression air conditioning systems include an evaporator, a compressor, a condenser, and an expansion device. A refrigeration cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

In particular, air conditioning systems containing compositions comprising mixtures of difluoromethane, pentafluoroethane, tetrafluoroethane and tetrafluoropropene are useful in regions with high ambient temperature. Therefore, the present invention also provides a heat transfer system comprising an air conditioning system designed for use in ambient temperatures above 35° C. In particular, these refrigerant compositions are useful for systems operating in ambient temperatures at 35° C. or higher. In another embodiment, the method for producing cooling is useful for systems operating in ambient temperatures of 40° C. or higher. In another embodiment, the method for producing cooling is useful for systems operating in ambient temperatures of 45° C. or higher. In another embodiment, the method for producing cooling is useful for systems operating in ambient temperatures of 50° C. or higher. In another embodiment, the method for producing cooling is useful for systems operating in ambient temperatures of 55° C. or higher. In another embodiment, the method for producing cooling is useful for systems operating in ambient temperatures of 60° C. or higher. In another embodiment, the method for producing cooling is useful for systems operating in ambient temperatures from 35-50° C. In another embodiment, the method for producing cooling is useful for systems operating in ambient temperatures from 35-60° C. In another embodiment, the method for producing cooling is useful for systems operating in ambient temperatures from 40-60° C. In another embodiment, the method for producing cooling is useful for systems operating in ambient temperatures from 45-60° C. In another embodiment, the method for producing cooling is useful for systems operating in ambient temperatures from 50-60° C.

For high ambient temperature conditions, the condenser temperature can be approximated at about 10° C. above the ambient temperature. Thus an ambient temperature of 35° C. would require a condenser temperature of about 45° C.

In one embodiment, the air conditioning system condenser is operated at a temperature of 45° C. or higher. In another embodiment, the air conditioning system condenser is operated at a temperature of 50° C. or higher. In another embodiment, the air conditioning system condenser is operated at a temperature of 55° C. or higher. In another embodiment, the air conditioning system condenser is operated at a temperature of 60° C. or higher. In another embodiment, the air conditioning system condenser is operated at a temperature of 65° C. or higher. In another embodiment, the air conditioning system condenser is operated at a temperature of 70° C. or higher.

In another embodiment, the air conditioning system condenser is operated at a temperature from 45-70° C. In another embodiment, the air conditioning system condenser is operated at a temperature from 50-70° C. In another embodiment, the air conditioning system condenser is operated at a temperature from 55-70° C. In another embodiment, the air conditioning system condenser is operated at a temperature from 60-70° C.

In one embodiment, for use in air conditioning systems in high ambient regions the compositions comprise (a) from 3 weight percent to 23 weight percent difluoromethane; (b) from 2 weight percent to 16 weight percent pentafluoroethane: (c) from 26 weight percent to 42 weight percent 1,1,2,2-tetrafluoroethane; and (d) from 34 weight percent to 53 weight percent 2,3,3,3-tetrafluoropropene. In another embodiment, the compositions consist of (a) difluoromethane, (b) pentafluoroethane, (c) 1,1,2,2-tetrafluoroethane and (d) 2,3,3,3-tetrafluoropropene.

In another embodiment, for use in air conditioning systems in high ambient regions the compositions comprise (a) from 10 weight percent to 28 weight percent difluoromethane; (b) from 6 weight percent to 19 weight percent pentafluoroethane: (c) from 16 weight percent to 25 weight percent 1,1,2,2-tetrafluoroethane; and (d) from 38 weight percent to 58 weight percent E-1,3,3,3-tetrafluoropropene. In another embodiment, the compositions consist of (a) difluoromethane, (b) pentafluoroethane, (c) 1,1,2,2-tetrafluoroethane and (d) E-1,3,3,3-tetrafluoropropene.

In another embodiment, for use in air conditioning systems in high ambient regions the compositions comprise (a) from 9 weight percent to 29 weight percent difluoromethane; (b) from 6 weight percent to 19 weight percent pentafluoroethane: (c) from 9 weight percent to 16 weight percent 1,1,1,2-tetrafluoroethane; and (d) from 42 weight percent to 68 weight percent E-1,3,3,3-tetrafluoropropene. In another embodiment, the compositions consist of (a) difluoromethane, (b) pentafluoroethane, (c) 1,1,1,2-tetrafluoroethane and (d) E-1,3,3,3-tetrafluoropropene.

The compositions of the present invention comprising mixtures of difluoromethane, pentafluoroethane, tetrafluoroethane and tetrafluoropropene may be used in a heat transfer systems in combination with molecular sieves to aid in removal of moisture. Desiccants may be composed of activated alumina, silica gel, or zeolite-based molecular sieves. In some embodiments, the molecular sieves are most useful with a pore size of approximately 3 Angstroms, 4 Angstroms, or 5 Angstroms. Representative molecular sieves include MOLSIV XH-7, XH-6, XH-9 and XH-11 (UOP LLC, Des Plaines, Ill.).

EXAMPLES

The concepts described herein will be further described in the following examples, which do not limit the scope of this invention.

In the following examples, the composition designations are as follows:

TABLE 1

| Composition designation | R-32 (wt %) | R-125 (wt %) | R-134a (wt %) | R-134 (wt %) | R-1234yf (wt %) | R-1234ze (wt %) |
|---|---|---|---|---|---|---|
| A | 11 | 14.5 | 23 | 7.5 | 44 | 0 |
| B | 11 | 14 | 24 | 6.5 | 44.5 | 0 |
| C | 11 | 14 | 24 | 7 | 44 | 0 |
| D | 13 | 15 | 0 | 28 | 44 | 0 |
| E | 12 | 14 | 23 | 6 | 45 | 0 |
| F | 12 | 14 | 15 | 14 | 45 | 0 |
| G | 13 | 16 | 0 | 30 | 41 | 0 |
| H | 14 | 13 | 14 | 14 | 45 | 0 |
| I | 13 | 15 | 14 | 14 | 44 | 0 |
| J | 10 | 16 | 14 | 14 | 46 | 0 |
| K | 10 | 13 | 14 | 13 | 50 | 0 |
| L | 11 | 13 | 25 | 5 | 46 | 0 |
| M | 10 | 14 | 29 | 2 | 45 | 0 |
| N | 12 | 14.5 | 23 | 6.5 | 44 | 0 |
| O | 28.45 | 18.97 | 9.83 | 0 | 0 | 42.75 |
| P | 27.1 | 18.06 | 0 | 16.51 | 0 | 38.33 |
| Q | 23.33 | 15.55 | 0 | 26.89 | 34.23 | 0 |
| R | 9.9 | 6.6 | 15.61 | 0 | 0 | 67.89 |

TABLE 1-continued

| Composition designation | R-32 (wt %) | R-125 (wt %) | R-134a (wt %) | R-134 (wt %) | R-1234yf (wt %) | R-1234ze (wt %) |
|---|---|---|---|---|---|---|
| S | 10.32 | 6.88 | 0 | 24.92 | 0 | 57.88 |
| T | 3.74 | 2.5 | 0 | 41.25 | 52.51 | 0 |
| Comparative U | 20.24 | 13.49 | 27.17 | 0 | 39.1 | 0 |
| Comparative V | 1.61 | 1.08 | 39.9 | 0 | 57.41 | 0 |

Example 1

Cooling Performance

Cooling performance at typical air conditioning conditions for compositions of the present invention is determined and displayed in Table 2 as compared to R-22 and R-410A. Compressor discharge temperatures, COP (energy efficiency) and cooling capacity (cap) are calculated from physical property measurements for the following specific conditions:

| | |
|---|---|
| Evaporator temperature | 7° C. |
| Condenser temperature | 47° C. |
| Subcool amount | 12 K |
| Return gas superheat | 13 K |
| Compressor efficiency | 70% |

GWP has also been calculated based on IPCC AR4 values where available.

TABLE 2

| | GWP (AR4) | Avg Glide, K | Disch temp, ° C. | Cool Cap (kJ/m³) | Cap rel to R-22, % | Cool COP | COP rel to R-22, % |
|---|---|---|---|---|---|---|---|
| R-22 | 1810 | 0 | 80.8 | 4300 | 100 | 4.299 | 100 |
| R-410A | 2088 | 0.14 | 82.9 | 6225 | 145 | 4.040 | 94 |
| A | 996 | 4.2 | 66 | 3733 | 86.8 | 4.271 | 99 |
| B | 982 | 4.2 | 67 | 3730 | 86.7 | 4.271 | 99 |
| C | 988 | 4.3 | 66 | 3727 | 86.7 | 4.273 | 99 |
| D | 928 | 5.0 | 67 | 3748 | 87.2 | 4.283 | 100 |
| E | 969 | 4.4 | 67 | 3789 | 88.1 | 4.267 | 99 |
| F | 944 | 4.5 | 67 | 3749 | 87.2 | 4.275 | 99 |
| J | 986 | 4.3 | 66 | 3669 | 85.3 | 4.274 | 99 |
| K | 870 | 4.3 | 65 | 3627 | 84.3 | 4.278 | 99 |
| L | 945 | 4.2 | 66 | 3722 | 86.6 | 4.272 | 99 |
| M | 996 | 4.0 | 65.4 | 3695 | 85.9 | 4.270 | 99 |
| N | 992 | 4.4 | 66.5 | 3794 | 88.2 | 4.267 | 99 |

The data demonstrates that compositions of the present invention are capable of providing cooling in air conditioning equipment under typical air conditioning conditions with performance close to that of R-22 and do so with GWP lower than 1000. In fact, the present inventive compositions are closer to R-22 performance than the conventional R-410A refrigerant. Note that in all cases, the compressor discharge temperature is lower than that for R-22 as compared to a higher discharge temperature for R-410A. Additionally, the COP (a measure of energy efficiency) matches that for R-22 quite closely, while R-410A is considerably lower. The average temperature glide for the presently claimed compositions is acceptable for most air conditioning systems.

Example 2

Cooling Performance at High Ambient Temperature

Cooling performance at air conditioning conditions for high ambient temperatures for compositions of the present invention is determined and displayed in Table 3 as compared to R-22. Compressor discharge temperatures, COP (energy efficiency) and cooling capacity (cap) are calculated from physical property measurements for the following specific conditions:

| | |
|---|---|
| Evaporator temperature | 0° C. |
| Condenser temperature | 50° C. |
| Subcool amount | 10 K |
| Return gas superheat | 5 K |
| Compressor efficiency | 70% |

GWP has also been calculated based on IPCC AR4 values where available.

TABLE 3

| | GWP (AR4) | Avg Glide, K | Disch temp, ° C. | Cool Cap (kJ/m$^3$) | Cap rel to R-22, % | Cool COP | COP rel to R-22, % |
|---|---|---|---|---|---|---|---|
| R-22 | 1810 | 0 | 97 | 3269 | 100 | 3.147 | 100 |
| A | 996 | 3.9 | 74.7 | 2722 | 83.2 | 3.067 | 97.5 |
| B | 982 | 3.9 | 74.6 | 2720 | 83.2 | 3.067 | 97.5 |
| E | 969 | 4.1 | 75.2 | 2764 | 84.5 | 3.063 | 97 |
| F | 944 | 4.2 | 75.2 | 2737 | 83.7 | 3.071 | 98 |
| G | 985 | 4.7 | 76.4 | 2741 | 83.8 | 3.084 | 98 |
| I | 972 | 4.4 | 75.9 | 2789 | 85.3 | 3.066 | 97.4 |
| N | 992 | 4.1 | 75.3 | 2768 | 84.7 | 3.063 | 97 |

The data shows that under these conditions the compositions of the present invention provide acceptable temperature glide and COP (energy efficiency) within a few percent of R-22. Additionally the cooling capacity is within 20% of R-22 and the discharge temperature is still lower than that for R-22. (ambient temperature being approximated as about 10 degrees below the condenser temperature, and thus, about 40° C. ambient or 104° F.)

Example 3

Cooling Performance at Higher Ambient Temperature (e.g., Tropical)

Cooling performance at air conditioning conditions, such as those experienced in equatorial and tropical regions, for compositions of the present invention is determined and displayed in Table 4 as compared to R-22. Compressor discharge temperatures, COP (energy efficiency) and cooling capacity (cap) are calculated from physical property measurements for the following specific conditions:

| | |
|---|---|
| Evaporator temperature | 17° C. |
| Condenser temperature | 58° C. |
| Subcool amount | 10 K |
| Return gas superheat | 5 K |
| Compressor efficiency | 70% |

GWP has also been calculated based on IPCC AR4 values where available.

TABLE 4

| | GWP (AR4) | Avg Glide, K | Disch temp, ° C. | Cool Cap (kJ/m$^3$) | Cap rel to R-22, % | Cool COP | COP rel to R-22, % |
|---|---|---|---|---|---|---|---|
| R-22 | 1810 | 0 | 94.4 | 5262 | 100 | 4.126 | 100 |
| A | 996 | 3.8 | 78.3 | 4521 | 85.9 | 4.040 | 97.9 |

TABLE 4-continued

| | GWP (AR4) | Avg Glide, K | Disch temp, ° C. | Cool Cap (kJ/m$^3$) | Cap rel to R-22, % | Cool COP | COP rel to R-22, % |
|---|---|---|---|---|---|---|---|
| B | 982 | 3.8 | 78.3 | 4517 | 85.9 | 4.040 | 97.9 |
| E | 969 | 3.9 | 78.7 | 4582 | 87.1 | 4.031 | 97.7 |
| F | 944 | 4.0 | 78.7 | 4540 | 86.3 | 4.044 | 98.0 |
| G | 985 | 4.5 | 79.6 | 4552 | 86.5 | 4.063 | 98.5 |
| I | 972 | 4.2 | 79.3 | 4619 | 87.8 | 4.035 | 97.8 |
| N | 992 | 3.9 | 78.8 | 4589 | 87.2 | 4.032 | 97.7 |

Even under the extreme conditions of these high ambient temperatures (ambient temperature being approximated as about 10 degrees below the condenser temperature, and thus, about 48° C. ambient or 118° F.) the compositions of the present invention provide non-flammable, non-toxic, environmentally sustainable options for replacing R-22 with reasonable temperature glide, lower discharge temperatures, cooling capacity within 15% of that for R-22 and COP (energy efficiency) within 3% of that for R-22.

Example 4

Heating Performance

Heating performance in a residential heat pump for compositions of the present invention is determined and displayed in Table 5 as compared to R-22. The heating COP (energy efficiency) and heating capacity (cap) are calculated from physical property measurements for the following specific conditions:

| | |
|---|---|
| Evaporator temperature | 7° C. |
| Condenser temperature | 35° C. |
| Subcool amount | 10 K |
| Return gas superheat | 5 K |
| Compressor efficiency | 70% |

GWP has also been calculated based on IPCC AR4 values where available.

TABLE 5

| | GWP (AR4) | Heating Cap (kJ/m$^3$) | Cap rel to R-22, % | Heating COP | COP rel to R-22, % |
|---|---|---|---|---|---|
| R-22 | 1810 | 5340 | 100 | 7.429 | 100 |
| A | 996 | 4803 | 89.9 | 7.488 | 101 |
| B | 982 | 4799 | 89.9 | 7.488 | 101 |
| E | 969 | 4876 | 91.3 | 7.482 | 101 |
| G | 985 | 4811 | 90.1 | 7.496 | 101 |
| I | 972 | 4911 | 92.0 | 7.482 | 101 |
| N | 992 | 4882 | 91.4 | 7.482 | 101 |

The compositions of the present invention provide low GWP, non-flammable, non-toxic, environmentally sustainable options for replacing R-22 in heat pumps for heating that provide heating capacity within about 10% of that for R-22 and energy efficiency (COP) for heating improved over the energy efficiency possible when heat pump is operated with R-22.

Example 5

Heating Performance

Performance of compositions of the present invention in a heating cycle is summarized in Table 6 and Table 7. In the tables, $CAP_h$ is heating capacity, $T_{cr}$ is critical temperature, and $P_{cond}$ is the pressure in the condenser. The data is calculated for the following conditions:

| | |
|---|---|
| Evaporating Temperature | −10° C. |
| Condensing Temperature | 65° C. |
| Vapor Superheat at Compressor Inlet | 5 K |
| Liquid Subcooling at Condenser Exit | 10 K |
| Compressor Efficiency | 0.70 |

TABLE 6

| | 134a | O | P | Q | U (comparative) |
|---|---|---|---|---|---|
| HFO-1234yf, wt % | | 0 | 0 | 34.23 | 39.1 |
| HFO-1234ze-E, wt % | | 42.75 | 38.33 | 0 | 0 |
| HFC-134, wt % | | 0 | 16.51 | 26.89 | 0 |
| HFC-134a, wt % | 100 | 9.83 | 0 | 0 | 27.17 |
| HFC-32, wt % | | 28.45 | 27.1 | 23.33 | 20.24 |
| HFC-125, wt % | | 18.97 | 18.06 | 15.55 | 13.49 |
| $CAP_h$ [kJ/m³] | 1822 | 2842 | 2738 | 2811 | 2774 |
| $GWP_{100}$ | 1430 | 999 | 999 | 999 | 999 |
| $T_{cr}$ (Celsius) | 101 | 88.62 | 90.77 | 86.5 | 84.14 |
| $P_{Cond}$ (kPa) | 1,895 | 2,849 | 2,732 | 2,730 | 2,847 |
| Evaporator Glide | 0 | 6.07 | 6.02 | 4.16 | 3.27 |
| Condenser Glide | 0 | 6.17 | 6.61 | 4.64 | 3.76 |
| Compressor Discharge Temperature, ° C. | | 118.45 | 118.11 | 109.51 | 105.79 |
| $COP_h$ | 2.699 | 2.612 | 2.644 | 2.593 | 2.559 |

TABLE 7

| | 134a | R | S | T | V (comparative) |
|---|---|---|---|---|---|
| HFO-1234yf, wt % | | 0 | 0 | 52.51 | 57.41 |
| HFO-1234ze-E, wt % | | 67.89 | 57.88 | 0 | 0 |
| HFC-134, wt % | | 0 | 24.92 | 41.25 | 0 |
| HFC-134a, wt % | 100 | 15.61 | 0 | 0 | 39.9 |
| HFC-32, wt % | | 9.9 | 10.32 | 3.74 | 1.61 |
| HFC-125, wt % | | 6.6 | 6.88 | 2.5 | 1.08 |
| Blend $CAP_h$ [kJ/m³] | 1822 | 1,912 | 1,912 | 1,912 | 1,912 |
| Blend $GWP_{100}$ | 1430 | 524 | 593 | 577 | 622 |
| $T_{cr}$ (Celsius) | 101 | 100.44 | 102.59 | 100.07 | 94.96 |
| $P_{Cond}$ (kPa) | 1,895 | 2,002 | 1,978 | 1,997 | 2,030 |
| Evapaorator Glide | 0 | 3.5 | 3.34 | 1.28 | 0.41 |
| Condenser Glide | 0 | 5.83 | 5.72 | 1.99 | 0.86 |
| Compressor Discharge Temperature, ° C. | | 102.04 | 103.04 | 90.19 | 87.7 |
| $COP_h$ | 2.699 | 2.684 | 2.709 | 2.631 | 2.605 |

The compositions claimed herein are expected to be non-flammable as formulated. The results in Tables 6 and 7 demonstrate that the compositions of the present invention with significantly to modestly reduced GWPs relative to HFC-134a can provide heating capacities modestly to significantly higher than HFC-134a while maintaining COPs for heating largely comparable to those with HFC-134a. Moreover, the compositions of the present invention have significantly higher critical temperatures than the comparative compositions, U and V at comparable values of GWP and volumetric heating capacity. Thus the compositions of the present invention could deliver higher condensing temperatures in heating applications. In particular, among compositions of the present invention those compositions containing the largest proportions of HFO-1234ze-E and HFC-134 (e.g. compositions P and S in Table 6 and Table 7) could provide the highest critical temperatures and therefore could enable the highest heating temperatures at comparable values of GWP and volumetric heating capacity.

Example 6

Cooling Performance at High Ambient Temperature

Cooling performance at air conditioning conditions for high ambient temperatures for compositions of the present invention is summarized in Table 8. The data is calculated for the following conditions:

| | |
|---|---|
| Evaporating Temperature | 0° C. |
| Condensing Temperature | 50° C. |
| Vapor Superheat at Compressor Inlet | 5 K |
| Liquid Subcooling at Condenser Exit | 10 K |
| Compressor Efficiency | 0.70 |

TABLE 8

| | HFC-134a | E | E vs. HFC-134a [%] | F | F vs. HFC-134a [%] |
|---|---|---|---|---|---|
| HFO-1234yf, wt % | | 0 | | 52.51 | |
| HFO-1234ze-E, wt % | | 57.88 | | 0 | |
| HFC-134, wt % | | 24.92 | | 41.25 | |

TABLE 8-continued

|  | HFC-134a | E | E vs. HFC-134a [%] | F | F vs. HFC-134a [%] |
|---|---|---|---|---|---|
| HFC-134a, wt % | 100 | 0 |  | 0 |  |
| HFC-32, wt % |  | 10.32 |  | 3.74 |  |
| HFC-125, wt % |  | 6.88 |  | 2.5 |  |
| $CAP_{cool}$ [kJ/m$^3$] | 2,060.30 | 2,191.70 | 6.4 | 2,178.70 | 5.7 |
| $GWP_{100}$ | 1,430 | 593 | −58.5 | 577 | −59.7 |
| $P_{Cond}$ (MPa) | 1.32 | 1.39 |  | 1.41 |  |
| Evapaporator Glide | n/a | 4.84 |  | 1.8 |  |
| Condenser Glide | n/a | 6.48 |  | 2.34 |  |
| Compressor Discharge Temperature, ° C. | 72.85 | 78.82 |  | 69.36 |  |
| $COP_{cool}$ | 3.182 | 3.192 | 0.3 | 3.127 | −1.7 |

Composition E offers 6.4% higher cooling capacity and 0.3% higher cooling COP relative to HFC-134a while reducing GWP by 58.55. Composition F offers comparable performance to HFC-134a and low evaporator and condenser glide while reducing GWP by 59.7%.

Selected Embodiments

Embodiment A1: A composition comprising (a) from 1 to 29 weight percent difluoromethane; (b) from 1 to 19 weight percent pentafluoroethane; (c) from 9 to 42 weight percent 1,1,2,2-tetrafluoroethane, 1,1,1,2-tetrafluoroethane, or a mixture thereof; and (d) from 34 to 68 weight percent 2,3,3,3-tetrafluoropropene, E-1,3,3,3-tetrafluoropropene or mixture thereof; wherein when the composition contains 2,3,3,3-tetrafluoropropene, the composition also contains at least some 1,1,2,2-tetrafluoroethane; wherein the ratio of component (a) to component (b) is at most 1.5:1; and wherein the ratio of component (c) to component (d) is at least 0.04:1.

Embodiment A2: The composition of Embodiment A1 wherein the ratio of component (c) to component (d) is at least 0.23:1.

Embodiment A3: The composition of any of Embodiments A1-A2 consisting of (a) difluoromethane, (b) pentafluoroethane, (c) 1,1,2,2-tetrafluoroethane and (d) E-1,3,3,3-tetrafluoropropene.

Embodiment A4: The composition of any of Embodiments A1-A3 consisting of (a) difluoromethane, (b) pentafluoroethane, (c) 1,1,1,2-tetrafluoroethane and (d) E-1,3,3,3-tetrafluoropropene.

Embodiment A5: The composition of any of Embodiments A1-A4 consisting of (a) difluoromethane, (b) pentafluoroethane, (c) 1,1,2,2-tetrafluoroethane and (d) 2,3,3,3-tetrafluoropropene.

Embodiment A6: The composition of any of Embodiments A1-A5 consisting of (a) difluoromethane, (b) pentafluoroethane, (c) 1,1,2,2-tetrafluoroethane and 1,1,1,2-tetrafluoroethane, and (d) 2,3,3,3-tetrafluoropropene.

Embodiment A7: The composition of any of Embodiments A1-A6, wherein the ratio of component (a) to component (b) is at least 1:1.

Embodiment A8: The composition of any of Embodiments A1-A7, wherein the ratio of component (a) to component (b) ranges from 1:1 to 1.5:1.

Embodiment A9: The composition of any of Embodiments A1-A8, wherein the ratio of component (c) to component (d) is at most 0.80:1.

Embodiment A10: The composition of any of Embodiments A1-A9, wherein the ratio of component (c) to component (d) ranges from 0.23:1 to 0.80:1.

Embodiment A11: The composition of any of Embodiments A1-A10, wherein the composition provides volumetric heating capacity that is at least 105% of the volumetric heating capacity for HFC-134a at the same cycle conditions.

Embodiment A12: The composition of any of Embodiments A1-A11, wherein the composition is non-flammable as determined by ASTM-E681 at 60° C.

Embodiment A13: The composition of any of Embodiments A1-A12, wherein the composition has a GWP less than 1000.

Embodiment A14: The composition of any of Embodiments A1, A2, A5, or A7-A13, comprising (a) from 3 weight percent to 23 weight percent difluoromethane; (b) from 2 weight percent to 16 weight percent pentafluoroethane: (c) from 26 weight percent to 42 weight percent 1,1,2,2-tetrafluoroethane; and (d) from 34 weight percent to 53 weight percent 2,3,3,3-tetrafluoropropene.

Embodiment A15: The composition of any of Embodiments A1, A2, A5, or A7-A14 consisting of (a) difluoromethane, (b) pentafluoroethane, (c) 1,1,2,2-tetrafluoroethane and (d) 2,3,3,3-tetrafluoropropene.

Embodiment A16: The composition of any of Embodiments A1, A2, A4, or A7-A13, comprising (a) from 10 weight percent to 28 weight percent difluoromethane; (b) from 6 weight percent to 19 weight percent pentafluoroethane; (c) from 16 weight percent to 25 weight percent 1,1,2,2-tetrafluoroethane; and (d) from 38 weight percent to 58 weight percent E-1,3,3,3-tetrafluoropropene.

Embodiment A17: The composition of any of Embodiments A1, A2, A5, A7-A13 or A16 consisting of (a) difluoromethane, (b) pentafluoroethane, (c) 1,1,2,2-tetrafluoroethane and (d) E-1,3,3,3-tetrafluoropropene.

Embodiment A18: The composition of any of Embodiments A1, A2, A4, or A7-A13, comprising (a) from 9 weight percent to 29 weight percent difluoromethane; (b) from 6 weight percent to 19 weight percent pentafluoroethane: (c) from 9 weight percent to 16 weight percent 1,1,1,2-tetrafluoroethane; and (d) from 42 weight percent to 68 weight percent E -1,3,3,3-tetrafluoropropene.

Embodiment A19: The composition of any of Embodiments A1, A2, A4, A7-A13 or A18 consisting of (a) difluoromethane, (b) pentafluoroethane, (c) 1,1,1,2-tetrafluoroethane and (d) E-1,3,3,3-tetrafluoropropene.

Embodiment A20: The composition of any of Embodiments A1-A19 wherein the ratio of difluoromethane to pentafluoroethane is from 1.2:1 to 1.5:1.

Embodiment A21: The composition of any of Embodiments A1-A20 wherein the ratio of difluoromethane to pentafluoroethane is from 1.3:1 to 1.5:1.

Embodiment A22: The composition of any of Embodiments A1, A2, A6, or A7-A13, comprising (a) 10-14 weight percent difluoromethane; (b) 13-16 weight percent pentafluoroethane; (c) 2-30 weight percent 1,1,2,2-tetrafluoroethane and 0-29 weight percent 1,1,1,2-tetrafluoroethane; and (d) 40-50 weight percent 2,3,3,3-tetrafluoropropene.

Embodiment A23: The composition of any of Embodiments A1, A2, A6-A13 or A22, comprising (a) 11-13 weight percent difluoromethane; (b) 14-15 weight percent pentafluoroethane; (c) 5-28 weight percent 1,1,2,2-tetrafluoroethane and 15-29 weight percent 1,1,1,2-tetrafluoroethane; and (d) 44-46 weight percent 2,3,3,3-tetrafluoropropene.

Embodiment A24: The composition of any of Embodiments A1, A2, A6-A13, A22 or A23 consisting of (a)

difluoromethane, (b) pentafluoroethane, (c) 1,1,2,2-tetrafluoroethane and 1,1,1,2-tetrafluoroethane, and (d) 2,3,3,3-tetrafluoropropene.

Embodiment B1: A method for producing heating in a heat pump comprising extracting heat from a working fluid comprising a composition of any of Embodiments A1-A24, in a working fluid cooler, thereby producing a cooled working fluid.

Embodiment C1: A method for producing heating in a heat pump wherein heat is exchanged between at least two cascade heating stages comprising absorbing heat in a first working fluid at a selected lower temperature in a first cascade heating stage and transferring this heat to a second working fluid of a second cascade heating stage that rejects heat at a higher working fluid temperature; wherein at least one of the first working fluid or the second working fluid comprises a composition of any of Embodiments A1-A24.

Embodiment D1: A method for producing cooling comprising evaporating a composition of any of Embodiments A1-A24 in the vicinity of a body to be cooled and thereafter condensing said composition.

Embodiment E1: A method for producing air conditioning in high ambient temperatures comprising evaporating a composition of any of Embodiments A1-A24 and thereafter condensing said composition.

Embodiment E2: The method of Embodiment E1, wherein the ambient temperatures are 35° C. or higher.

Embodiment F1: A method for replacing HCFC-22, R-410A, R-407C, HFC-134a, or CFC-12 working fluid in a high temperature heat pump comprising providing a replacement working fluid comprising a composition of any of Embodiments A1-A24 to said high temperature heat pump.

Embodiment G1: A method is provided for replacing HCFC-22 in high ambient air conditioning apparatus comprising providing a composition of any of Embodiments A1-A24 to said apparatus.

Embodiment H1: A method is provided for replacing HCFC-124 in industrial air conditioning apparatus, comprising providing a composition of any of Embodiments A1-A24 to said apparatus.

Embodiment I1: A heat transfer system comprising an evaporator, compressor, condenser and an expansion device; wherein said system contains a composition of any of Embodiments A1-A24.

Embodiment I2: The heat transfer system of Embodiment I1 comprising a heat pump apparatus.

Embodiment I3: The heat transfer system of claim Embodiment I1 comprising an air conditioning apparatus.

Embodiment I4: The heat transfer system of Embodiment I3 wherein said air conditioning apparatus is designed for ambient temperatures above 35° C.

Embodiment I5: The heat transfer system of any of Embodiments I1 or I3 comprising an automobile air conditioning apparatus.

What is claimed is:

1. A composition comprising:
   a. from 1 to 29 weight percent difluoromethane;
   b. from 1 to 19 weight percent pentafluoroethane;
   c. from 9 to 42 weight percent 1,1,2,2-tetrafluoroethane, or a mixture thereof with 1,1,1,2-tetrafluoroethane; and
   d. from 34 to 68 weight percent 2,3,3,3-tetrafluoropropene, E-1,3,3,3-tetrafluoropropene or mixture thereof;
   wherein the ratio of component (a) to component (b) is at most 1.5:1; and
   wherein the ratio of component (c) to component (d) is at least 0.04:1.

2. The composition of claim 1 consisting of (a) difluoromethane, (b) pentafluoroethane, (c) 1,1,2,2-tetrafluoroethane and (d) E-1,3,3,3-tetrafluoropropene.

3. The composition of claim 1 consisting of (a) difluoromethane, (b) pentafluoroethane, (c) 1,1,2,2-tetrafluoroethane and (d) 2,3,3,3-tetrafluoropropene.

4. The composition of claim 1 consisting of (a) difluoromethane, (b) pentafluoroethane, (c) 1,1,2,2-tetrafluoroethane and 1,1,1,2-tetrafluoroethane, and (d) 2,3,3,3-tetrafluoropropene.

5. The composition of claim 1, comprising
   a. from 3 weight percent to 23 weight percent difluoromethane;
   b. from 2 weight percent to 16 weight percent pentafluoroethane:
   c. from 26 weight percent to 42 weight percent 1,1,2,2-tetrafluoroethane; and
   d. from 34 weight percent to 53 weight percent 2,3,3,3-tetrafluoropropene.

6. The composition of claim 5 consisting of (a) difluoromethane, (b) pentafluoroethane, (c) 1,1,2,2-tetrafluoroethane and (d) 2,3,3,3-tetrafluoropropene.

7. The composition of claim 1, comprising
   a. from 10 weight percent to 28 weight percent difluoromethane;
   b. from 6 weight percent to 19 weight percent pentafluoroethane:
   c. from 16 weight percent to 25 weight percent 1,1,2,2-tetrafluoroethane; and
   d. from 38 weight percent to 58 weight percent E-1,3,3,3-tetrafluoropropene.

8. The composition of claim 7 consisting of (a) difluoromethane, (b) pentafluoroethane, (c) 1,1,2,2-tetrafluoroethane and (d) E-1,3,3,3-tetrafluoropropene.

9. The composition of claim 1, comprising
   a. 10-14 weight percent difluoromethane;
   b. 13-16 weight percent pentafluoroethane;
   c. 2-30 weight percent 1,1,2,2-tetrafluoroethane and 0-29 weight percent 1,1,1,2-tetrafluoroethane; and
   d. 40-50 weight percent 2,3,3,3-tetrafluoropropene.

10. The composition of claim 9, comprising
    a. 11-13 weight percent difluoromethane;
    b. 14-15 weight percent pentafluoroethane;
    c. 5-28 weight percent 1,1,2,2-tetrafluoroethane and 15-29 weight percent 1,1,1,2-tetrafluoroethane; and
    d. 44-46 weight percent 2,3,3,3-tetrafluoropropene.

11. The composition of claim 9 consisting of (a) difluoromethane, (b) pentafluoroethane, (c) 1,1,2,2-tetrafluoroethane and 1,1,1,2-tetrafluoroethane, and (d) 2,3,3,3-tetrafluoropropene.

12. A method for producing heating in a heat pump comprising extracting heat from a working fluid comprising a composition of claim 1, in a working fluid cooler, thereby producing a cooled working fluid.

13. A method for producing heating in a heat pump wherein heat is exchanged between at least two cascade heating stages comprising absorbing heat in a first working fluid at a selected lower temperature in a first cascade heating stage and transferring this heat to a second working fluid of a second cascade heating stage that rejects heat at a higher working fluid temperature; wherein at least one of the first working fluid or the second working fluid comprises a composition of claim 1.

14. A method for producing cooling comprising evaporating a composition of claim 1 in the vicinity of a body to be cooled and thereafter condensing said composition.

15. A method for producing air conditioning in high ambient temperatures comprising evaporating a composition of claim 1 and thereafter condensing said composition.

16. A heat transfer system comprising an evaporator, compressor, condenser and an expansion device; wherein said system contains a composition of claim 1.

17. A refrigerant composition comprising difluoromethane, pentafluoroethane, 2,3,3,3-tetrafluoropropene and 1,1,2,2-tetrafluoroethane or mixtures of 1,1,2,2-tetrafluoroethane and 1,1,1,2-tetrafluoroethane, wherein the composition comprises:
  A. 10-14 weight percent difluoromethane;
  B. 13-16 weight percent pentafluoroethane;
  C. 0-29 weight percent 1,1,1,2-tetrafluoroethane;
  D. 2-30 weight percent 1,1,2,2-tetrafluoroethane; and
  E. 40-50 weight percent 2,3,3,3-tetrafluoropropene; and wherein said composition is used in air conditioning equipment at ambient temperature of 35° C. or higher.

18. A method of producing cooling comprising evaporating the composition of claim 17 in the vicinity of a body to be cooled and thereafter condensing said composition.

19. A method for producing heating in a heat pump comprising extracting heat from a working fluid comprising a composition of claim 17, in a heat exchanger, thereby producing a cooled working fluid.

* * * * *